(12) United States Patent
Markoski et al.

(10) Patent No.: US 8,551,667 B2
(45) Date of Patent: Oct. 8, 2013

(54) HYDROGEL BARRIER FOR FUEL CELLS

(75) Inventors: Larry J. Markoski, Raleigh, NC (US); Dilip Natarajan, Cary, NC (US); Alex Primak, Morrisville, NC (US)

(73) Assignee: INI Power Systems, Inc., Morrisville, NC (US)

( * ) Notice: Subject to any disclaimer, the term of this patent is extended or adjusted under 35 U.S.C. 154(b) by 1148 days.

(21) Appl. No.: 12/105,071

(22) Filed: Apr. 17, 2008

(65) Prior Publication Data

US 2008/0274393 A1 Nov. 6, 2008

Related U.S. Application Data

(60) Provisional application No. 60/912,344, filed on Apr. 17, 2007.

(51) Int. Cl.
*H01M 8/04* (2006.01)
*H01M 8/08* (2006.01)

(52) U.S. Cl.
USPC .......................................... 429/450; 429/428

(58) Field of Classification Search
USPC ................................. 429/428, 450
See application file for complete search history.

(56) References Cited

U.S. PATENT DOCUMENTS

| | | |
|---|---|---|
| 3,357,861 A | 12/1967 | Hunger |
| 3,849,275 A | 11/1974 | Candor |
| 3,902,916 A | 9/1975 | Warszawski |
| 3,992,223 A | 11/1976 | Gutbier |
| 4,066,526 A | 1/1978 | Yeh |
| 4,311,594 A | 1/1982 | Peny |
| 4,614,575 A * | 9/1986 | Juda et al. ............ 204/265 |
| 4,652,504 A | 3/1987 | Ando |
| 4,722,773 A | 2/1988 | Plowman et al. |
| 4,732,822 A | 3/1988 | Wright et al. |
| 4,732,823 A | 3/1988 | Ito et al. |
| 4,783,381 A | 11/1988 | Tytgat et al. |
| 5,185,218 A | 2/1993 | Brokman et al. |

(Continued)

FOREIGN PATENT DOCUMENTS

| | | |
|---|---|---|
| CA | 2 473 329 | 10/2009 |
| EP | 0 252 559 | 6/1991 |

(Continued)

OTHER PUBLICATIONS

Hollinger et al., "Nanoporous separator and low fuel concentration to minimize crossover in direct methanol laminar flow fuel cells," Journal of Power of Sources, pp. 3523-3528, (2010).

(Continued)

*Primary Examiner* — Maria J Laios
(74) *Attorney, Agent, or Firm* — Evan Law Group LLC

(57) ABSTRACT

A fuel cell includes an anode including an anode catalyst, a cathode, a channel that is contiguous with the anode, and a liquid electrolyte in the channel. The cathode includes a gas diffusion electrode, a cathode catalyst on the gas diffusion electrode, and a hydrogel on the cathode catalyst. The hydrogel is between the anode and the cathode, and includes an aqueous liquid and a polymer. The polymer has an acid capacity less than 0.8 meq/g and/or has no sulfonic acid groups covalently bound to the polymer. A method of generating electricity includes flowing a liquid electrolyte through the channel, oxidizing a fuel at the anode, and reducing a gaseous oxidant at the cathode.

19 Claims, 12 Drawing Sheets

(56) References Cited

U.S. PATENT DOCUMENTS

| | | |
|---|---|---|
| 5,290,414 A | 3/1994 | Marple |
| 5,316,629 A | 5/1994 | Clifford et al. |
| 5,413,881 A | 5/1995 | Licht et al. |
| 5,534,120 A | 7/1996 | Ando et al. |
| 5,599,638 A | 2/1997 | Surampudi et al. |
| 5,648,183 A | 7/1997 | Licht et al. |
| 5,846,670 A | 12/1998 | Watanabe |
| 5,858,567 A | 1/1999 | Spear, Jr. et al. |
| 5,863,671 A | 1/1999 | Spear, Jr. et al. |
| 5,952,118 A | 9/1999 | Ledjeff et al. |
| 6,007,931 A | 12/1999 | Fuller et al. |
| 6,013,385 A | 1/2000 | DuBose |
| 6,024,848 A | 2/2000 | Dufner et al. |
| 6,039,853 A | 3/2000 | Gestermann et al. |
| 6,054,427 A | 4/2000 | Winslow |
| 6,103,413 A | 8/2000 | Hinton et al. |
| 6,110,613 A | 8/2000 | Fuller |
| 6,136,272 A | 10/2000 | Weigl et al. |
| 6,242,123 B1 | 6/2001 | Nezu et al. |
| 6,255,012 B1 | 7/2001 | Wilson et al. |
| 6,312,846 B1 | 11/2001 | Marsh et al. |
| 6,432,918 B1 | 8/2002 | Winslow |
| 6,437,011 B2 | 8/2002 | Steck et al. |
| 6,444,343 B1 | 9/2002 | Prakash et al. |
| 6,447,943 B1 | 9/2002 | Peled et al. |
| 6,472,090 B1 | 10/2002 | Colbow et al. |
| 6,472,091 B1 | 10/2002 | Konrad et al. |
| 6,485,851 B1 | 11/2002 | Narayanan et al. |
| 6,492,047 B1 | 12/2002 | Peled et al. |
| 6,497,975 B2 | 12/2002 | Bostaph et al. |
| 6,528,200 B1 | 3/2003 | Yoshitake et al. |
| 6,607,655 B1 | 8/2003 | Lowe et al. |
| 6,638,654 B2 | 10/2003 | Jankowksi et al. |
| 6,641,948 B1 | 11/2003 | Ohlsen et al. |
| 6,713,206 B2 | 3/2004 | Markoski et al. |
| 6,715,899 B1 | 4/2004 | Wu |
| 6,716,548 B1 | 4/2004 | Kaliaguine et al. |
| 6,720,105 B2 | 4/2004 | Ohlsen et al. |
| 6,727,016 B2 | 4/2004 | Bostaph et al. |
| 6,808,840 B2 | 10/2004 | Mallari et al. |
| 6,811,916 B2 | 11/2004 | Mallari et al. |
| 6,852,443 B1 | 2/2005 | Ohlsen |
| 6,871,844 B2 | 3/2005 | Yan et al. |
| 6,890,680 B2 | 5/2005 | Beckmann et al. |
| 6,893,763 B2 | 5/2005 | Fan et al. |
| 6,911,411 B2 | 6/2005 | Cox et al. |
| 6,924,058 B2 | 8/2005 | Ohlsen et al. |
| 6,960,285 B2 | 11/2005 | Schoeniger et al. |
| 7,014,944 B2 | 3/2006 | Kordesch et al. |
| 7,067,216 B2 | 6/2006 | Yan et al. |
| 7,087,333 B2 | 8/2006 | Schäfer |
| 7,090,793 B2 | 8/2006 | Ma et al. |
| 7,205,064 B2 | 4/2007 | Markoski et al. |
| 7,252,898 B2 | 8/2007 | Markoski et al. |
| 7,635,530 B2 | 12/2009 | Kenis et al. |
| 7,651,797 B2 | 1/2010 | Markoski et al. |
| 7,901,817 B2 | 3/2011 | Markoski et al. |
| 8,119,305 B2 | 2/2012 | Markoski et al. |
| 8,158,300 B2 | 4/2012 | Markoski et al. |
| 8,163,429 B2 | 4/2012 | Markoski et al. |
| 2001/0033960 A1 | 10/2001 | Cavalca et al. |
| 2001/0041283 A1 | 11/2001 | Hitomi |
| 2002/0015868 A1 | 2/2002 | Surampudi et al. |
| 2002/0028372 A1 | 3/2002 | Ohlsen et al. |
| 2002/0031695 A1 | 3/2002 | Smotkin |
| 2002/0041991 A1 | 4/2002 | Chan et al. |
| 2002/0083640 A1* | 7/2002 | Finkelshtain et al. .......... 44/314 |
| 2002/0091225 A1 | 7/2002 | McGrath et al. |
| 2002/0127454 A1 | 9/2002 | Narang et al. |
| 2003/0003336 A1 | 1/2003 | Colbow et al. |
| 2003/0003341 A1 | 1/2003 | Kinkelaar et al. |
| 2003/0003348 A1 | 1/2003 | Hanket |
| 2003/0091883 A1 | 5/2003 | Peled et al. |
| 2003/0096151 A1 | 5/2003 | Blunk et al. |
| 2003/0110841 A1 | 6/2003 | Zhang et al. |
| 2003/0134163 A1 | 7/2003 | Markoski et al. |
| 2003/0148159 A1 | 8/2003 | Cox et al. |
| 2003/0170524 A1* | 9/2003 | Kordesch et al. ............... 429/34 |
| 2003/0175581 A1 | 9/2003 | Kordesch et al. |
| 2003/0194596 A1 | 10/2003 | Ye et al. |
| 2003/0194598 A1 | 10/2003 | Chan |
| 2003/0198852 A1 | 10/2003 | Masel et al. |
| 2003/0219640 A1 | 11/2003 | Nam et al. |
| 2003/0231004 A1 | 12/2003 | Takahashi et al. |
| 2004/0018415 A1 | 1/2004 | Lai et al. |
| 2004/0039148 A1 | 2/2004 | Cao et al. |
| 2004/0045816 A1 | 3/2004 | Masel et al. |
| 2004/0058217 A1 | 3/2004 | Ohlsen et al. |
| 2004/0062965 A1 | 4/2004 | Morse et al. |
| 2004/0072047 A1 | 4/2004 | Markoski et al. |
| 2004/0084789 A1 | 5/2004 | Yan et al. |
| 2004/0096721 A1 | 5/2004 | Ohlsen et al. |
| 2004/0101740 A1 | 5/2004 | Sanders |
| 2004/0115518 A1 | 6/2004 | Masel et al. |
| 2004/0121208 A1 | 6/2004 | James et al. |
| 2004/0121209 A1 | 6/2004 | Yan et al. |
| 2004/0126666 A1 | 7/2004 | Cao et al. |
| 2004/0151965 A1 | 8/2004 | Forte et al. |
| 2004/0209153 A1 | 10/2004 | Peled et al. |
| 2004/0209154 A1 | 10/2004 | Ren et al. |
| 2004/0265681 A1 | 12/2004 | Markoski et al. |
| 2005/0001352 A1 | 1/2005 | Ma et al. |
| 2005/0003263 A1 | 1/2005 | Mallari et al. |
| 2005/0008923 A1 | 1/2005 | Malhotra |
| 2005/0026026 A1 | 2/2005 | Yen et al. |
| 2005/0053826 A1 | 3/2005 | Wang et al. |
| 2005/0074657 A1 | 4/2005 | Rusta-Sallehy et al. |
| 2005/0084737 A1 | 4/2005 | Wine et al. |
| 2005/0084738 A1 | 4/2005 | Ohlsen et al. |
| 2005/0089748 A1 | 4/2005 | Ohlsen et al. |
| 2005/0123812 A1 | 6/2005 | Okamoto |
| 2005/0136309 A1 | 6/2005 | Masel et al. |
| 2005/0161342 A1 | 7/2005 | Carson et al. |
| 2005/0191541 A1 | 9/2005 | Gurau et al. |
| 2005/0202305 A1 | 9/2005 | Markoski et al. |
| 2005/0252784 A1 | 11/2005 | Choban et al. |
| 2006/0003217 A1 | 1/2006 | Cohen et al. |
| 2006/0035136 A1 | 2/2006 | Markoski et al. |
| 2006/0040146 A1 | 2/2006 | Yamaguchi |
| 2006/0040147 A1 | 2/2006 | Yamaguchi |
| 2006/0059769 A1 | 3/2006 | Masel et al. |
| 2006/0078785 A1 | 4/2006 | Masel et al. |
| 2006/0088744 A1 | 4/2006 | Markoski et al. |
| 2006/0141328 A1 | 6/2006 | Johnston et al. |
| 2006/0147785 A1 | 7/2006 | Chiang et al. |
| 2006/0210867 A1 | 9/2006 | Kenis |
| 2006/0222923 A1 | 10/2006 | Muramatsu et al. |
| 2006/0228622 A1 | 10/2006 | Cohen et al. |
| 2007/0020491 A1 | 1/2007 | Ogburn |
| 2007/0190393 A1 | 8/2007 | Markoski et al. |
| 2007/0298312 A1 | 12/2007 | Koehler et al. |
| 2008/0070083 A1 | 3/2008 | Markoski et al. |
| 2008/0248343 A1 | 10/2008 | Markoski et al. |
| 2008/0274393 A1 | 11/2008 | Markoski et al. |
| 2009/0035644 A1 | 2/2009 | Markoski et al. |
| 2010/0196800 A1 | 8/2010 | Markoski et al. |
| 2011/0003226 A1 | 1/2011 | Markoski et al. |
| 2011/0008713 A1 | 1/2011 | Markoski et al. |
| 2012/0301799 A1 | 11/2012 | Markoski et al. |
| 2013/0017467 A1 | 1/2013 | Markoski et al. |

FOREIGN PATENT DOCUMENTS

| | | |
|---|---|---|
| EP | 0 664 930 B1 | 5/1996 |
| EP | 1 818 654 A1 | 8/2007 |
| EP | 1 819 004 A1 | 8/2007 |
| GB | 1018825 | 2/1966 |
| GB | 1 416 483 | 12/1975 |
| JP | 46-16452 | 5/1971 |
| JP | 63 313472 A | 12/1988 |
| JP | 4-284889 | 10/1992 |
| JP | 10-211447 A | 8/1998 |
| JP | 2005-515602 | 5/2005 |
| KR | 10-2008-0045416 | 5/2008 |
| WO | WO 94/09524 | 4/1994 |

| | | |
|---|---|---|
| WO | WO 96/12317 | 4/1996 |
| WO | WO 98/06145 | 2/1998 |
| WO | WO 00/15872 | 3/2000 |
| WO | WO 01/37357 | 5/2001 |
| WO | WO 01/39307 A2 | 5/2001 |
| WO | WO 01/54216 A2 | 7/2001 |
| WO | WO 01/94450 A2 | 12/2001 |
| WO | WO 02/11226 A2 | 2/2002 |
| WO | WO 03/002247 A1 | 1/2003 |
| WO | WO 03/009410 A2 | 1/2003 |
| WO | WO 03/061037 | 7/2003 |
| WO | WO 03/106966 A2 | 12/2003 |
| WO | WO 2004/027891 A2 | 4/2004 |
| WO | WO 2004/027901 A2 | 4/2004 |
| WO | WO 2005/001975 | 1/2005 |
| WO | WO 2005/004262 | 1/2005 |
| WO | WO 2005/082024 | 9/2005 |
| WO | WO2005/082024 A2 | 9/2005 |
| WO | WO 2005/088759 A2 | 9/2005 |
| WO | WO 2006/101967 | 9/2006 |
| WO | WO 2007013880 | 2/2007 |
| WO | WO 2007/095492 | 8/2007 |
| WO | WO 2008/122042 | 10/2008 |

OTHER PUBLICATIONS

Mench, et al., "Design of a Micro Direct Methanol Fuel Cell (μDMFC)," Proceedings of the IMECE, 8 pages (2001).

Chen et al., "Ion exchange resin/polystyrene sulfonate composite membranes for PEM fuel cells", Journal of Membrane Science, 243, pp. 327-333, 2004.

Granados-Focil et al., "Polyphenylene Sulfonic Acid: A new PEM", http://www1.eere.energy.gov/hydrogenandfuelcells/pdfs/hi_tem_pems_talk.pdf, 26 pages, 2003.

Jiang et al., "$CO_2$ Crossover Through a Nafion Membrane in a Direct Methanol Fuel Cell", Electrochemical and Solid-State Letters, 5 (7), pp. A156-A159, 2002.

Service, "New Polymer May Rev Up the Output of Fuel Cells Used to Power Cars", Science, vol. 312, p. 35, 2006.

Thomas et al., "Fuel Cells—Green Power", Los Alamos National Laboratory, http://www.scied.science.doe.gov/nmsb/hydrogen/Guide%20to%20Fuel%20Cells.pdf, 36 pages, 1999.

Hejze et al., "Preparation of Pd-coated polymer electrolyte membranes and their application in direct methanol fuel cells", Journal of Power Sources, 140, pp. 21-27, 2005.

Kordesch et al., "Direct methanol-air fuel cells with membranes plus circulating electrolyte", Journal of Power Sources, 96, pp. 200-203, 2001.

Li et al., "An improved palladium-based DMFCs cathode catalyst", Chem. Commun., pp. 2776-2777, 2004.

Peled et al., "0.5 $W/cm^2$ Direct Methanol-Air Fuel Cell", Electrochemical and Solid-State Letters, 7 (12), pp. A507-A510, 2004.

Baker, "Membrane Technology," Encyclopedia of Polymer Science and Technology, vol. 3, pp. 184-249, 2001.

Kim et al., "Non-Naifion Membrane Electrode Assemblies", Los Alamos National Laboratory, http://www.hydrogen.energy.gov/pdfs/review06/fc_3_kim.pdf, pp. 1-24, 2005.

Shim et al., Naifion-impregnated polyethylene-terephthalate film used as the electrolyte for direct methanol fuel cells, Electrochimica Acta, 50, pp. 2385-2391, 2005.

"Celtec® V-Membrane for DMFC Applications", PEMAS Fuel Cell Technologies, 6 pages, printed Jul. 19, 2005.

Rozière et al., "Non-Fluorinated Polymer Materials for Proton Exchange Membrane Fuel Cells", Annu. Rev. Mater. Res., 33, pp. 503-555, 2003.

Shim et al., "Electrochemical Acceleration of Hydrogen Transfer Through a Methanol Impermeable Metallic Barrier", Journal of the Electrochemical Society, 150 (12), pp. A1583-A1588, 2003.

Tang et al., "Modification of Nafion™ membrane to reduce methanol crossover via self-assembled Pd nanoparticles", Materials Letters, 59, pp. 3766-3770, 2005.

Peled et al., "A Direct Methanol Fuel Cell Based on a Novel Low-Cost Nanoporous Proton-Conducting Membrane", Electrochemical and Solid-State Letters, 3 (12), pp. 525-528, 2000.

Peled et al., "Novel approach to Recycling Water and Reducing Water Loss in DMFCs", Electrochemical and Solid-State Letters, 6 (12), pp. A268-A271, 2003.

Blum et al., "Water-neutral micro direct-methanol fuel cell (DMFC) for portable applications", Journal of Power Sources, 117, pp. 22-25, 2003.

Zhu et al., "The behavior of palladium catalysts in direct formic acid fuel cells", Journal of Power Sources, 139, pp. 15-20, 2005.

Sigracet, GDL 24 & 25 Series Gas Diffusion Layer, product information, SGL Carbon Group, 2 pages, 2004.

Choi et al., "Modification of proton conducting membrane for reducing methanol crossover in a direct-methanol fuel cell", Journal of Power Sources, 96, pp. 411-414, 2001.

Pu et al., "A Methanol Impermeable Proton Conducting Composite Electrolyte System", Journal of the Electrochemical Society, 142, pp. L119-L120, 1995.

Kim et al., "Evaluation of a palladinized Nafion™ for direct methanol fuel cell application", Electrochimica Acta, 49, pp. 3227-3234, 2004.

Halliday. et al., "Fundamentals of Physics", Extended Third Edition, pp. 662-685, 1988.

Osmonics The Filtration Spectrum, Osmonics, Inc., Minnetonka, Minnesota, 1 page, (1984).

Xia, S.J. et al., Proceedings of the $207^{th}$ Meeting of the Electrochemical Society, Abstract #779, Quebec City, Canada, May 21-25, (2005).

Choban, E.R. et al., "Microfluidic Fuel Cells That Lack A PEM", Power Sources Proceedings, vol. 40, pp. 317-320, (2002).

Choban, E.R. et al., "Membraneless Fuel Cell Based on Laminar Flow," ASME Fuel Cell Science, Engineering and Technology Proceedings, pp. 261-265, (2003).

Ferrigno, R. et al., "Membraneless Vanadium Redox Fuel Cell Using Laminar Flow", J. Am. Chem. Soc., vol. 124, pp. 12930-12931, (2002).

Choban, E.R. et al., "Characterization of Limiting Factors in Laminar Flow-Based Membraneless Microfuel Cells", Electrochemical and Solid-State Letters, 8 (7), pp. A348-A352, (2005).

Choban, E.R. et al., "Microfluidic Fuel Cell Based on Laminar Flow", J. Power Sources, 128, pp. 54-60, (2004).

www.whatman.com "Leadership in separations technology for the life Sciences", 1 page, (2009).

Jankowski, A.F. et al., "Micro-Fabricated Thin-film Fuel Cells for Portable Power Requirements", Spring Meeting of the Materials Research Society, San Francisco, CA, Apr. 1-5, 2002, 7 pages, (2002).

Chan, K-Y et al., "Meniscus behavior and oxygen reduction in tapered pore gas diffusion electrodes", Electrochimica Acta, vol. 33, No. 12, pp. 1767-1773, (1988).

Chan, K-Y et al., "A wedge-meniscus model of Gas-Diffusion Electrodes", Electrochimica Acta, 32, 8, pp. 1227-1232, (1987).

Waszczuk, P. et al., "Methanol Electrooxidation on Platinum/Ruthenium Nanoparticle Catalysts", Journal of Catalysis, 203, pp. 1-6, (2001).

Peng, F.Z. et al., "A new ZVS bidirectional dc-dc converter for fuel cell and battery application," IEEE Transactions on Power Electronics, 19, 1, pp. 54-65, (2004).

Krein, P.T. et al., "Low cost inverter suitable for medium-power fuel cells," IEEE Power Electronics Specialists Conference, vol. 1, pp. 321-326, (2002).

Cygan, P.J. et al., "Hybrid Power Sources for Military Applications," The Eighteenth Annual Battery Conference on Applications and Advances, pp. 85-90, (1998).

Jarvis, L.P. et al., "Hybrid Power Source for Manportable Applications," IEEE Aerospace and Electronic Systems Magazine, 18, 1, pp. 13-16, (2003).

Atwater, T.B. et al., "Man portable power needs of the $21^{st}$ century," Journal of Power Sources, vol. 91, No. 1, pp. 27-36, (2000).

Jarvis, L.P. et al., "Fuel cell/Lithium-ion battery hybrid for manportable applications," The Seventeenth Annual Battery Conference on Applications and Advances, pp. 69-72, (2002).

Gao, L. et al. "An actively controlled fuel cell/battery to meet pulsed power demands," Journal of Power Sources, 130, pp. 202-207, (2004).

Zheng, J.P. et al., "Hybrid power sources for pulsed current applications," IEEE Transactions on Aerospace and Electronic Systems, vol. 37, pp. 288-292, (2001).

Jiang, Z. et al., "Design and experimental tests of control strategies for active hybrid fuel cell/battery power sources," Journal of Power Sources, 130, pp. 163-171 (2004).

Acharya, P. et al., "An advanced fuel cell simulator," IEEE Applied Power Electronics Conference, pp. 1554-1558, (2004).

Weigl, B.H. et al., "Microfluidic diffusion-based separation and detection", Science, 283, pp. 346-347, (1999).

Kenis, P.J.A. et al., "Microfabrication Inside Capillaries Using Multiphase Laminar Flow Patterning", Science, vol. 285, pp. 83-85, (1999).

Wesseler, E.P. et al., "The Solubility of Oxygen in Highly Fluorinated Liquids", Journal of Fluorine Chemistry, 9, pp. 137-146, (1977).

Riess, J.G. et al., "Solubility and Transport Phenomena in Perfluorochemicals Relevant to Blood Substitution and Other Biomedical Applications", Pure & Appl. Chem., vol. 54, No. 12, pp. 2383-2406, (1982).

International Search Report dated Oct. 25, 2006 for PCT application No. PCT/US05/05962.

Rice, C. et al., "Direct Formic Acid Fuel Cells", Journal of Power Sources, vol. 111, pp. 83-89, (2002).

Lu, G-Q et al., "Formic Acid Decomposition on Polycrystalline Platinum and Palladized Platinum Electrodes", J. Phys. Chem., vol. 103, pp. 9700-9711, (1999).

Waszczuk, P. et al., "A nanoparticle catalyst with superior activity for electrooxidation of formic acid", Electrochemistry Communications, vol. 4, pp. 599-603, (2002).

International Search Report dated Mar. 30, 2007 for PCT application No. PCT/US05/32990.

Park, S. et al., "Electrochemical Infrared Characterization of CO Domains on Ruthenium-Decorated Platinum Nanoparticles" J. Am. Chem. Soc. 125, pp. 2282-2290, (2003).

Babu, P.K. et al., "Electronic Alterations Caused by Ruthenium in Pt-Ru Alloy Nanoparticles as Revealed by Electrochemical NMR", J. Phys. Chem., 107, pp. 7595-7600, (2003).

Hentges, P.J. et al., "Planar tunneling spectroscopic studies of splitting vs. non-splitting of the zero-bias conductance peak in $YBa_2Cu_3O_{7-x}$ thin films", Physica C, 408-410, pp. 801-803, (2004).

Hentges, P.J. et al., "Solution-growth of ultra-thin, insulating layers of zirconia for passivation and tunnel junction fabrication on YBCO thin films", IEEE Transactions on Applied Superconductivity, v. 13, No. 2, pp. 801-804, (2003).

Greene, L.H. et al., "Planar tunneling spectroscopy of high-temperature superconductors: Andreev bound states and broken symmetries", Physica C, 387, pp. 162-168, (2003).

Greene, L.H. et al., "Detection and Control of Broken Symmetries with Andreev Bound State Tunneling Spectroscopy: Effects of Atomic-Scale Disorder", Physica C, 408-410, pp. 804-806, (2004).

Kimball, J.W. et al., "Issues with low-input-voltage boost converter design," IEEE Power Electronics Specialists Conference, Aachen, Germany, pp. 2152-2156, (2004).

Ismagilov, R.F. et al., "Experimental and theoretical scaling laws for transverse diffusive broadening in two-phase laminar flows in microchannels," Applied Physics Letters, vol. 76, No. 17, pp. 2376-2378, (2000).

Kenis, P.J.A. et al., "Microfabrication Inside Capillaries Using Multiphase Laminar Flow Patterning," Science, vol. 285, pp. 83-85, (1999).

Ismagilov, R.F. et al., "Pressure-driven laminar flow in tangential microchannels: an elastomeric microfluidic switch", Anal. Chem., 73, pp. 4682-4687, (2001).

Dobbs, B.G. et al., "A multiple-input dc-dc converter topology", IEEE Power Electronic Letters, vol. 1, No. 1, pp. 6-9, (2003).

Musunuri, S. et al., "Fabrication and Characterization of PDMA Inductors", IEEE Power Electronics Specialists Conference, Aachen, Germany, pp. 4460-4466, (2004).

Coutanceau, C. et al., "Radioactive Labeling Study and FTIR Measurements of Methanol Adsorption and Oxidation on Fuel Cell Catalysts", Fuel Cells, 2, pp. 153-158, (2002).

Jankowski A.F., et al., "Sputter Deposition of Metallic Sponges", 48th International Symposium on the American Vacuum Society, San Francisco, CA, Oct. 26-Nov. 2, 2001, 14 pages (2001).

Guo, J-W., et al., "Effect of Current collector corrosion made from Printed Circuit Board (PCB) on the degradation of self-breathing direct methanol fuel cell stack", Electrochimica Acta, 53, pp. 3056-3064, (2008).

Morse, J. et al., "An Integrated Microfluidic Fuel Cell System for Energy Conversion from Hydrocarbon Fuels", Electrochemical Society Spring Symposium, Philadelphia, PA, May 12-17, 2002, 1 page, (2002).

Park H.G. et al., "Transport in a Microfluidic Catalytic Reactor", Proceedings of HT2003, ASME Summer Heat Transfer Conference, Jul. 21-23, 2003, Las Vegas, Nevada, pp. 1-10, (2003).

Zhang, J. et al., "Electrochemical Measurement of $O_2$ Permeation Rate through Polymer Electrolyte Membranes", 216th ECS Meeting, Abstract #830, The Electrochemical Society, 1 page, (2009).

Chu, D. et al., Alkaline Membrane Electrolyte Fuel Cell Research and Development at the U.S. Army Research Laboratory, 216th ECS Meeting, Abstract #385, The Electrochemical Society, 1 page, (2009).

Jiang, R. et al., "Water and Fuel Crossover in a Direct Methanol Fuel Cell Stack", 212th ECS Meeting, Abstract #601, The Electrochemical Society, 1 page, (2007).

Jiang, R. et al., "A Palladium Deposited Nafion Membrane via Supercritical Carbon Dioxide (sc-$CO_2$) Medium for DMFCs", 207th ECS Meeting, Abstract #784, The Electrochemical Society, 1 page, (2005).

Jiang, R. et al., "Sol-Gel Derived Nafion/Silica Hybrid Electrolyte Membranes for Direct Methanol Fuel Cells (DMFCs)", 207th ECS Meeting, Abstract #56, The Electrochemical Society, 1 page, (2005).

Jiang, R. et al., "Direct Methanol Fuel Cell System Performance: From Materials, Components, to System and Fuel Efficiency", 209th ECS Meeting, Abstract #1143, The Electrochemical Society, 1 page, (2006).

Jiang, R. et al., "Durability Evaluation of Direct Methanol Fuel Cells", 208th ECS Meeting, Abstract #1216, The Electrochemical Society, 1 page, (2005).

Jiang, R. et al., "Comparison of Several Research Approaches for Direct Methanol Fuel Cell Membranes", 208th ECS Meeting, Abstract #965, The Electrochemical Society, 1 page, (2005).

Jankowski, A.F. et al., Micro-Fabricated Thin-Film Fuel Cells for Portable Power Requirements, Mat. Res. Soc. Symp.Proc., vol. 730, pp. V4.2.1-V4.2.6, (2002).

Choban, E.R, et al, "Microfluidic fuel cell based on laminar flow", Journal of Power Sources, vol. 128, pp. 54-60, (2004).

International Search Report dated May 29, 2006 for application No. PCT/US2004/020597.

Kenis, P.J.A, et al, "Fabrication inside microchannels using fluid flow", Accounts of Chemical Research, vol. 33, No. 12, pp. 841-847, (2000).

E. Choban, et al, "Microfluidic Fuel Cells That Lack A PEM" Power Sources Proceedings, vol. 40, 2002, pp. 317-320, XP009031634.

R. Ferrigno, et al, "Membraneless Vanadium Redox Fuel Cell Using Laminar Flow" JACS Communications, vol. 124, 2002, pp. 12930-12931, XP002282850.

M. Mench, et al, "Design of Micro Direct Methanol Fuel Cell (Proceedings of the IMECE'01, Nov. 11-16, 2001)", 2001, The American Society of Mechanical Engineers, New York XP002282851.

S. C. Kelley, et al, "A Miniature Methanol/Air Polymer Electrolyte Fuel Cell", Electrochemical and Solid-State Letters, IEEE Service Center, Piscataway, NJ, vol. 3, No. 9, 2000, pp. 407-409, XP001023907.

Branebjerg et al, "Application of Miniature Analyzers from Microfluidic Components to uTAS," Proceedings of Micro Total Analysis Systems Conference, Netherlands, 1994, pp. 141-151.

Brody et al, "Diffusion-Based Extraction in a Microfabricated Device," Sensors and Actuators, 1997, pp. 13-18, vol. A58.

Carrette et al, "Fuel Cells-Findamentals and Applications," Fuel Cells, 2001, pp. 5-39, vol. I.

Duffy et al, "Rapid Prototyping of Microfluidic Systems in Poly(dimethylsiloxane)," Anal. Chem, 1998, pp. 4974-4984, vol. 70.

EG&G Services et al, Fuel Cell Handbook, Fifth Edition, 2000, U.S. Department of Energy, Office of Fossil Energy, National Energy Technology Laboratory, pp. I-xiii, 1-1 to 12-4.
Heinzel et al, "A Review of the State-of-the-Art of the Methanol Crossover in Direct Methanol Fuel Cells," J. Power Sources, 1999, pp. 70-74, vol. 84.
Kenis et al, "Microfabrication Inside Capillaries Using Multiphase Laminar Flow Patterning," Science, 1999, pp. 83-85, vol. 285.
Kim et al, "Diffusion-Based Sample Cleanup Microchip for Protein Analysis by Electrospray Ionization Mass Spectrometry," obtained at http://pittcon.omnibooksonline.comR001/papers/0226.pdf as of at least Jul. 24, 2001, 2 pages.
Pickett et al, "Ionic Mass Transfer in Parallel Plate Electrochemical Cells," J. Applied Electrochemistry, 1972, pp. 151-156, vol. 2.
Thomas et al, "Los Alamos National Laboratory Monograph LA-UR-99-3231," Fuel Cells: Green Power, 1999, pp. 1-33.
Waszczuk et al, "Methanol Electrooxidation on Platinum-RutheniumNanoparticle Catalysts," J. Catalysis, 2001, pp. 1-6, vol. 203.
Zhao et al, "Surface-Directed Liquid Flow Inside Microchannels," Science, 2001, pp. 1023-1026, vol. 291.
Markoski, "Summary of Knowledge About Laminar Flow Fuel Cells," 2002, 1 page.
Ro et al, "Sample Clean-Up Using Multiphase Laminar Microfluidics for Electrospray Ionization Mass Spectrometry," obtained at http://nanotech.osu.edu/abstracts/hahn.htm as of at least Jul. 24, 2001, 2 pages.
Delphion search conducted Oct. 23, 2002, for U.S. patents containing "perfluorocarbon and fuel cell" in the claims, 1 page.
Delphion search conducted Oct. 23, 2002, for U.S. patents containing "fuel cell and oxygen carrier and perfluror",1 page.
Delphion search conducted Aug. 23, 2002, for U.S. patents and applications containing "pefluoro" and "ballard",1 page.
Delphion search conducted Aug. 23, 2002, for U.S. patents containing "perflurocarbons", 2 pages.
Davis, "NISTIR 6848, Proposed Testing Methodology and Laboratory Facilities for Evaluating Residential Fuel Cell Systems," NIST, 2002, 14 pages.
Dupont Zonyl FS-62, Fluorosurfactant Information Sheet, 2001, 2 pages.
Riess et at, oSolubility and Transport Phenomena in Perfluorochemicals Relevant to Blood Substitution and Other Biomedical Applications, Pure & Appl. Chem, 1982, pp. 2383-2406, vol. 54.
Wesseler et al, The Solubility of Oxygen in Highly Fluorinated Liquids, J. Fluorine Chem, pp. 137-146, vol. 9.
Gang, X, et al, "Electrolyte additives for phosphoric acid fuel cells", Journal of the Electrochemical Society, vol. 140, No. 4, pp. 896-902, (1993).
International Search Report dated Dec. 13, 2005 for PCT application No. PCT/US2004/020342.
Kronberger, H, et al, "Reduction of oxygen from electrolyte emulsions with high oxygen contents", Journal of Power Sources, vol. 86, pp. 562-567, (2000).
International Search Report dated Jun. 21, 2004 for PCT application No. PCT/US2003/00226.
Kelley et al, "Miniature Fuel Cells Fabricated on Silicon Substrates," AIChE Journal 48, pp. 1071-1082, 2002.
Maynard et al, "Miniature fuel cells for portable power: Design considerations and challenges," J. Vac. Sci. Technol, B 20(4), pp. 1287-1297, 2002.
Steele et al, "Materials for fuel-cell technologies", Nature, vol. 414, pp. 345-352, 2001.
Lu et al, Development and characterization of a silicon-based micro direct methanol fuel cell, Electrochimica Acta 49, pp. 821-828, 2004.
Yeom et al, "Microfabrication and characterization of a silicon-based millimeter scale, PEM fuel cell operating with hydrogen, methanol, or formic acid," Sensors and Actuators, B, 107, pp. 882-891, 2005.
Lee et al, "Design and fabrication of a micro fuel cell array with "flip-flop" interconnection," Journal of Power Sources, 112, pp. 410-418, 2002.
Hahn et al, "Development of a planar micro fuel cell with thin film and micropatterning technologies," Journal of Power Sources, 131, pp. 73-78, 2004.
Mitrovski et al, "Microfluidic Devices for Energy Conversion: Planar Integration and Performance of a Passive, Fully Immersed H2—O2 Fuel Cell," Langmuir, 20, pp. 6974-6976, 2004.
Meyers et al, "Design considerations for miniaturized PEM fuel cells," Journal of Power Sources, 109, pp. 76-88 2002.
Yen et al, "A micro methanol fuel cell operating at near room temperature," Applied Physics Letters, vol. 83, No. 19, pp. 4056-4058, 2003.
Motokawa et al, MEMS-based design and fabrication of a new concept micro direct methanol fuel cell (µ-DMFC), Electrochemistry Communications, 6, pp. 562-565, 2004.
Ha, et al, "A miniature air breathing direct formic acid fuel cell," Journal of Power Sources, 128, pp. 119-124, 2004.
Ismagilov et al, "Experimental and theoretical scaling laws for transverse diffusive broadening in two-phase laminar flows in microchannels," Applied Physics Letters, vol. 76, No. 17, pp. 2376-2378, 2000.
Kamholz et al, "Quantitative Analysis of Molecular Interaction in a Microfluidic Channel: The T-Sensor," Anal. Chem, 71, pp. 5340-5347, 1999.
Krishnan et al, "Microfabricated reaction and separation systems", Current Opinion in Biotechnology 12, p. 92, 2001.
Zheng et al, "Formation of Arrayed Droplets by Soft Lithography and Two-Phase Fluid Flow, and Application in Protein Crystallization," Adv. Mater, 16, No. 15, 1365-1368, 2004.
Cohen et al, "Fabrication and preliminary testing of a planar membraneless microchannel fuel cell", J. Power Sources, 139, pp. 96-105, 2005.
Spendelow et al, "Electrooxidation of adsorbed CO in Pt(1 1 1) and Pt(1 1 1)/Ru in alkaline media and comparison with results from acidic media," Journal of Electroanalytical Chemistry, 568, pp. 215-224, 2004.
McLean et al, "An assessment of alkaline fuel cell technology," International Journal of Hydrogen Energy, 27, pp. 507-526, 2002.
Prabhuram et al, "Investigation of methanol oxidation on unsupported platinum electrodes in strong alkali and strong acid," Journal of Power Sources, 74, pp. 54-61, 1998.
Tripkovic et al, "Methanol oxidation at platinum electrodes in alkaline solution: comparison between supported catalysts and model systems," Journal of Electroanalytical Chemistry, 572, pp. 119-128, 2004.
Agel et al, "Characterization and use of anionic membranes for alkaline fuel cells," Journal of Power Sources, 101, pp. 267-274, 2001.
Wang et al, "A feasibility analysis for alkaline membrane direct methanol fuel cell: thermodynamic disadvantages versus kinetic advantages," Electrochemistry Communications, 5, 662-666, 2003.
Danks et al, "Alkaline anion-exchange radiation-grafted membranes for possible electrochemical application in fuel cells," J. Mater. Chem, 13, pp. 712-721, 2003.
Yu et al, "Development of direct methanol alkaline fuel cells using anion exchange membranes," Journal of Power Sources, 137, pp. 248-256, 2004.
Iwasita, "Electrocatalysis of methanol oxidation", Electrochim. Acta 47, pp. 3663-3674, 2002.
Barton et al, "Enzymatic Biofuel Cells for Implantable and Microscale Devices," Chem. Rev, 104, pp. 4867-4886, 2004.
Astris Energi Inc, "Advantages of the Alkaline Fuel Cell," can be located at: http://www.fuelcellmarkets.com/article_default_view.fcm ?articleid=6194&subsite=912, 1 page, 2005.
Chen et al, "A Miniature Biofuel Cell," J. Am. Chem. Soc, 123, pp. 8630-8631, 2001.
Mano et al, "A Miniature Biofuel Cell Operating in a Physiological Buffer," J. Am. Chem. Soc, 124, pp. 12962-12963, 2002.
Kim et al, "A Miniature Membrane-less Biofuel Cell Operating under Physiological Conditions at 0.5 V," A. J. Electrochem. Soc. 150 (2), A209-A213, 2003.
Mano et al, "A Miniature Membraneless Biofuel Cell Operating at 0.36 V under Physiological Conditions," Journal of The Electrochemical Society, 150, 8, pp. A1136-A1138, 2003.

Mano et al, "Characteristics of a Miniature Compartment-less Glucose-O2 Biofuel Cell and Its Operation in a Living Plant," J. Am. Chem. Soc, 125, pp. 6588-6594, 2003.

Choban et al, "Characterization of Limiting Factors in Laminar Flow-Based Membraneless Microfuel Cells," Electrochemical and Solid State Letters, 8 (7), pp. A348-A352, 2005.

Choban et al, "Membraneless laminar flow-based micro fuel cells operating in alkaline, acidic, and acidic/alkaline media," Electrochimica Acta, vol. 50, No. 27, pp. 5390-5398, 2005.

Cohen et al, "A Dual Electrolyte H2/O2 Planar Membraneless Microchannel Fuel Cell System with Open Circuit Potentials in Excess of 1.4 V," Lagmuir 21, pp. 3544-3550, available online Mar. 16, 2005.

Skoog et al, "Electrochemical Cells, Fundamentals of Analytical Chemistry", CBS College Publishing, 4th ed, p. 306, 1982.

FCTec, "Alkaline Fuel Cells (AFC)," can be located at: http://www.fctec.com/fctec_types_afc.asp, 1 page, 2005.

Tse, "Alkaline Fuel Cell," can be located at: http://www.visionengineer.com/env/al.php, 1 page, 2005.

Neah Power Systems, located at www.neahpower.com, 42 pages, 2003-2004.

INI Power Systems, located at www.inipower.com, 3 pages, 2004.

Yeom et al, "A Silicon Microfabricated Direct Formic Acid Fuel Cell," ASME Fuel Cell Science, Engineering and Technology Proceedings, pp. 267-272, 2003.

Yeom et al, "A Microscale Vapor-Fed Formic Acid Fuel Cell," Solid-State Sensors and Actuators Workshop, Hilton Head Island, SC, pp. 125-128, Jun. 2004.

Choban et al, "Membraneless Fuel Cell Based on Laminar Flow," ASME Fuel Cell Science, Engineering and Technology Proceedings, pp. 261-265, 2003.

Choban et al, "Microfluidic Fuel Cells That Lack a PEM," Power Sources Proceedings, 40, pp. 317-320, 2002.

Invitation to Pay Additional Fees and Partial Search Report dated Feb. 5, 2007 for PCT application No. PCT/US2006/009502, 9 Pages.

Chen, C.Y. et al., "Portable DMFC system with methanol sensor-less control", Journal of Power Sources, 167, pp. 442-449, (2007).

Livshits, V. et al., "Direct ethylene glycol fuel-cell stack—Study of oxidation intermediate products", Journal of Power Sources, 178, pp. 687-691, (2008).

Cooper, K.R. et al., "Electrical Test Methods for On-Line Fuel Cell Ohmic Resistance Measurement", Journal of Power Sources, vol. 160, pp. 1088-1095, (2006).

Niemann, J., "Unraveling Fuel Cell Electrical Measurements", Fuel Cell Magazine, Apr./May, pp. 26-31, (2005).

Smith, M. et al., "Comparison of Fuel Cell Electrolyte Resistance Measurement Techniques", Fuel Cell Magazine, Apr./May, pp. 32-37, (2005).

U.S. Appl. No. 11/533,210, Mailed Jul. 19, 2011.

International Search Report dated Sep. 12, 2007 for PCT Appl. No. PCT/US2007/061980.

Primak et al., "Improved Performance of Direct Methanol Laminar Flow Fuel Cells," Proceedings 207th ECS Meeting, Abstract #137, Quebec City, Canada, May 15-20, (2005).

International Search Report dated Jun. 24, 2008 for PCT Appl. No. PCT/US2008/059146.

\* cited by examiner

HYDROGEL BARRIER FOR FUEL CELLS

REFERENCE TO RELATED APPLICATIONS

This application claims the benefit of U.S. Provisional Application No. 60/912,344 entitled "Hydrogel Barrier For Fuel Cells" filed Apr. 17, 2007, which is incorporated by reference in its entirety.

BACKGROUND

Fuel cell technology shows great promise as an alternative energy source for numerous applications. Several types of fuel cells have been constructed, including polymer electrolyte membrane fuel cells, direct methanol fuel cells, alkaline fuel cells, phosphoric acid fuel cells, molten carbonate fuel cells, and solid oxide fuel cells. For a comparison of several fuel cell technologies, see Los Alamos National Laboratory monograph LA-UR-99-3231 entitled *Fuel Cells: Green Power* by Sharon Thomas and Marcia Zalbowitz.

FIG. 1 represents an example of a fuel cell 100, including a high surface area anode 110 including an anode catalyst 112, a high surface area cathode 120 including a cathode catalyst 122, and an electrolyte 130 between the anode and the cathode. The electrolyte may be a liquid electrolyte; it may be a solid electrolyte, such as a polymer electrolyte membrane (PEM); or it may be a liquid electrolyte contained within a host material, such as the electrolyte in a phosphoric acid fuel cell (PAFC).

In operation of the fuel cell 100, fuel in the gas and/or liquid phase is brought over the anode 110 where it is oxidized at the anode catalyst 112 to produce protons and electrons in the case of hydrogen fuel, or protons, electrons, and carbon dioxide in the case of an organic fuel. The electrons flow through an external circuit 140 to the cathode 120 where air, oxygen, or an aqueous oxidant (e.g., peroxide) is being fed. Protons produced at the anode 110 travel through electrolyte 130 to cathode 120, where oxygen is reduced in the presence of protons and electrons at cathode catalyst 122, producing water in the liquid and/or vapor state, depending on the operating temperature and conditions of the fuel cell.

Hydrogen and methanol have emerged as important fuels for fuel cells, particularly in mobile power (low energy) and transportation applications. The electrochemical half reactions for a hydrogen fuel cell are listed below.

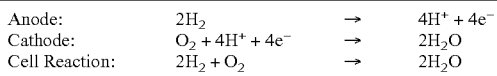

| Anode: | $2H_2$ | → | $4H^+ + 4e^-$ |
| Cathode: | $O_2 + 4H^+ + 4e^-$ | → | $2H_2O$ |
| Cell Reaction: | $2H_2 + O_2$ | → | $2H_2O$ |

To avoid storage and transportation of hydrogen gas, the hydrogen can be produced by reformation of conventional hydrocarbon fuels. In contrast, direct liquid fuel cells (DLFCs) utilize liquid fuel directly, and do not require a preliminary reformation step of the fuel. As an example, the electrochemical half reactions for a Direct Methanol Fuel Cell (DMFC) are listed below.

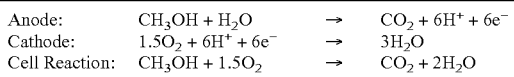

| Anode: | $CH_3OH + H_2O$ | → | $CO_2 + 6H^+ + 6e^-$ |
| Cathode: | $1.5O_2 + 6H^+ + 6e^-$ | → | $3H_2O$ |
| Cell Reaction: | $CH_3OH + 1.5O_2$ | → | $CO_2 + 2H_2O$ |

The reaction schemes illustrate the production of water at the cathode during operation of these fuel cells. The water content of the cathode during fuel cell operation is affected by factors including a) the production of water due to the normal course of the reduction reaction at the cathode, b) production of water from the oxidation of fuel that has crossed through the electrolyte to the cathode instead of reacting at the anode, and c) water flux from the electrolyte to the cathode. The contribution of water flux to the water content at the cathode may be affected by factors including a) molecular diffusion due to a concentration gradient between the electrolyte and the water at the cathode, b) water permeation due to the hydraulic pressure difference between the electrolyte and the water at the cathode, and c) electro-osmotic drag associated with proton ($H^+$) transport to the cathode.

If allowed to accumulate, liquid water at the cathode can severely limit the rate at which gaseous oxidant reaches the catalyst surface. This can result in an undesirable condition referred to as "cathode flooding" in which at least a portion of the cathode catalyst is blocked from contact with oxidant gas due to the presence of liquid on the catalyst. Consequently, water is typically removed from the cathode as vapor and/or liquid in the oxidant gas flow stream. This water either is vented from the system or is further condensed external to the fuel cell. If desired, the recovered water may then be supplied back to the anode for humidification of the anode stream and/or reaction with the fuel at the anode catalyst. Water lost from the fuel cell typically must be replaced in order to keep the cell in stoichiometric neutrality. If excess water in either the liquid or gaseous phase is vented from the system, then additional water typically is provided to the fuel cell to avoid dehydration. If a significant amount of water vapor must be condensed for recycling within the system, the fuel cell can have undesirable parasitic losses associated with high operating oxidant stoichiometries. Moreover, the presence of an external condenser that is large relative to the entire system can introduce additional weight, parasitic losses, and complexity to the fuel cell and the system incorporating the fuel cell.

The performance of conventional DMFCs may also suffer due to "methanol crossover," in addition to cathode flooding. The material used to separate the liquid fuel feed from the gaseous oxidant feed in a DMFC typically is a stationary PEM that is not fully impermeable to methanol or other dissolved fuels. As a result, methanol fuel may cross over the membrane from the anode to the cathode, reacting with the cathode catalyst directly in the presence of oxygen to produce heat, water and carbon dioxide, but no useable electric current. In addition to being an inherent waste of fuel, methanol crossover causes depolarization losses due to a mixed potential at the cathode and, in general, leads to decreased cell performance.

It is desirable to provide a system for controlling and reducing the amount of water at or within the cathode in a fuel cell, particularly for a fuel cell that uses air or oxygen as the oxidant. Preferably such a system would prevent and/or buffer the system against cathode flooding and, if needed, would recover the water produced by the fuel cell in order to maintain water neutrality without the addition of significant parasitic losses or of increased system complexity. It is also desirable to provide a fuel cell in which fuel crossover is minimized.

SUMMARY

In one aspect, the invention provides a fuel cell including an anode including an anode catalyst, a cathode, a channel that is contiguous with the anode, and a liquid electrolyte in the channel. The cathode includes a gas diffusion electrode, a cathode catalyst on the gas diffusion electrode, and a hydrogel on the cathode catalyst. The hydrogel is between the anode and the cathode, and includes an aqueous liquid and a polymer having an acid capacity less than 0.8 milliequivalents per gram (meq/g).

In another aspect, the invention provides a fuel cell including an anode including an anode catalyst, a cathode, a channel that is contiguous with the anode, and a liquid electrolyte in the channel. The cathode includes a gas diffusion electrode, a cathode catalyst on the gas diffusion electrode, and a hydrogel on the cathode catalyst. The hydrogel is between the anode and the cathode, and includes an aqueous liquid and a polymer including no sulfonic acid groups covalently bound to the polymer.

In another aspect, the invention provides a method of generating electricity from one of the above fuel cells. The method includes flowing the liquid electrolyte through the channel, oxidizing a fuel at the anode and reducing a gaseous oxidant at the cathode.

In another aspect, the invention provides a cathode for a fuel cell including a gas diffusion electrode, a cathode catalyst on the gas diffusion electrode, and a hydrogel on the cathode catalyst. The hydrogel includes an aqueous liquid and a polymer having an acid capacity less than 0.8 meq/g.

In another aspect, the invention provides a cathode for a fuel cell including a gas diffusion electrode, a cathode catalyst on the gas diffusion electrode, and a hydrogel on the cathode catalyst. The hydrogel includes an aqueous liquid and a polymer including no sulfonic acid groups covalently bound to the polymer.

In another aspect, the invention provides a fuel cell stack that includes a plurality of fuel cells including at least one of the above fuel cells.

In another aspect, the invention provides a power supply device that includes at least one of the above fuel cells.

In another aspect, the invention provides an electronic device that includes the above power supply device.

The following definitions are included to provide a clear and consistent understanding of the specification and claims.

The term "gas diffusion electrode" (GDE) means an electrically conducting porous material.

The term "hydrogel" means a polymeric network expanded with a liquid, where the polymeric network includes a polymer having chemical or physical crosslinks between the polymer chains.

The term "on", in the context of components of a fuel cell, means supported by. A first component that is on a second component may be separated from the second component by one or more other components. The first component may or may not be above the second component during the formation or operation of the cell.

The term "aqueous liquid" means a liquid containing at least 25 percent by weight (wt %) water.

The term "covalently bound" means that two substances are linked through a covalent bond. A covalent bond is a type of homopolar bonding where an electron is shared between two atoms to form the bond. Covalent bonds have definite directions in space, thus allowing for the spatial relationship between atoms to be maintained. Conversely, ionic bonds are formed by the transfer of an electron from one atom to another to create an attractive charge that forms the bond. Ionic bonds lack definite directions in space, thus preventing distinct spatial relationships between atoms. Unlike covalently bound compounds, ionic compounds dissociate in water and are commonly referred to as salts. Hydrogen bonds differ from covalent bonds because hydrogen bonds require three atoms and include heteroatoms or halogens. Covalent bonding is unlike hydrogen bonding where electrons are not shared between the atoms.

The term "osmosis" means the flux of solvent through a permeable material from a region of high chemical potential to a region of low chemical potential.

The term "hydraulic barrier" means a fluid-tight material that can maintain a concentration gradient between two fluids on either side of the barrier. The two fluids may be two gases, two liquids, or a gas and a liquid. A hydraulic barrier includes a liquid-tight material that can maintain a concentration gradient between two liquids of differing concentration on either side of the barrier. A hydraulic barrier may permit a net transport of molecules between the two fluids, but prevents mixing of the bulk of the two fluids.

BRIEF DESCRIPTION OF THE DRAWINGS

The invention can be better understood with reference to the following drawings and description. The components in the figures are not necessarily to scale, emphasis instead being placed upon illustrating the principles of the invention.

DETAILED DESCRIPTION

The present invention makes use of the discovery that incorporation of a liquid electrolyte having sufficient osmotic pressure into a fuel cell may allow for a decrease in the amount of water at the cathode during operation of the fuel cell. The present invention also makes use of the discovery that incorporation of a hydrogel on the cathode may allow for a further decrease in the amount of water at the cathode during operation of the fuel cell, where the hydrogel includes an aqueous liquid and a polymer. The polymer has an acid capacity less than 0.8 milliequivalents per gram (meq/g) and/or has no sulfonic acid groups covalently bound to the polymer. Fuel cells incorporating the liquid electrolyte and/or the hydrogel may operate under neutral water conditions without using parasitic external water management devices such as condensers or evaporators.

Figure 1:
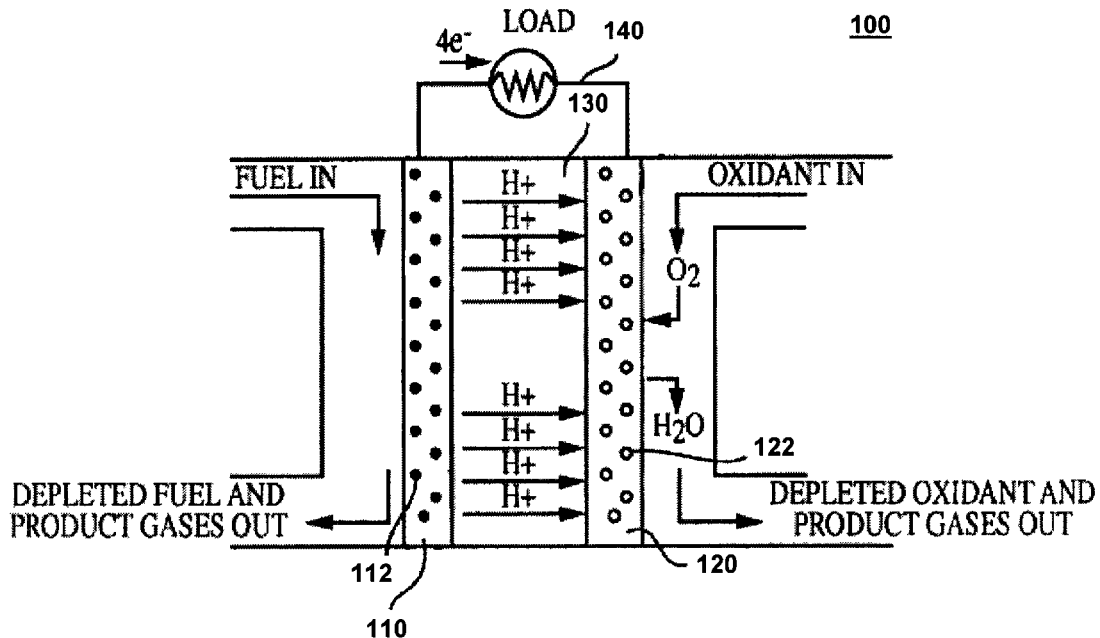
FIG. 1 is a schematic representation of a fuel cell.
Figure 2:
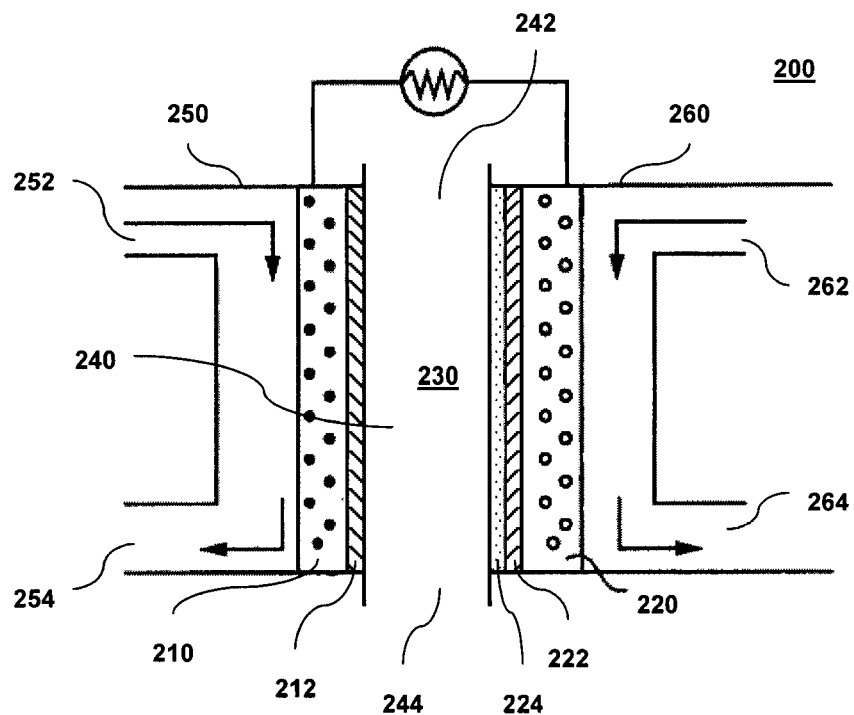
FIG. 2 is a schematic representation of a fuel cell having a liquid electrolyte and a hydrogel.

FIG. 2 represents an example of a fuel cell 200 that includes an anode 210, a cathode 220 including a hydrogel 222, and a liquid electrolyte 230. The liquid electrolyte 230 is in a channel 240 between the anode 210 and the cathode 220. The channel 240 is contiguous with the anode and cathode and includes an electrolyte inlet 242 and an electrolyte outlet 244. The liquid electrolyte may contain a fuel. The anode 210 has first and second surfaces. The first surface is in contact with the electrolyte, and optional blocking layer 212 may be present at the first surface. The second surface of anode 210 optionally may be in contact with optional fuel channel 250, including a fuel inlet 252 and optional fuel outlet 254. The fuel for reaction at the anode thus may be in the liquid electrolyte 230, in the optional fuel channel 250, or in both. The cathode 220 has first and second surfaces, and the first surface is in contact with an oxidant channel 260, including an oxidant inlet 262 and optional oxidant outlet 264. The second surface of cathode 220 includes the hydrogel 222, which is in contact with the channel 240, and optionally includes a screen 224 at the interface between the channel and the hydrogel.

The liquid electrolyte 230 may be any aqueous mixture of ions. The liquid electrolyte is characterized by an osmotic pressure (Π), which is defined as:

$$\Pi = (\text{solute concentration}) \times (\text{number of atoms or ions in solute}) \times R \times T$$

where R is the universal gas constant in units of kPa·m³/mol·Kelvin, T is the temperature in units of Kelvin, and the solute concentration is in units of kmol/m³, giving units of osmotic pressure in terms of kPa. Osmotic pressure of the liquid electrolyte can be measured by freezing point depression osmometry or vapor pressure osmometry, which may be carried out on a commercially available osmometer, such as those available from Advanced Instruments, Inc. (Norwood, Mass.) or from KNAUER ASI (Franklin, Mass.). Preferably the liquid electrolyte has an osmotic pressure of at least 1.2 megapascals (MPa). More preferably the liquid electrolyte has an osmotic pressure of at least 2.5 MPa, more preferably of at least 3.5 MPa, more preferably of at least 10 MPa, more preferably of at least 15 MPa, more preferably of at least 20 MPa, and more preferably of at least 25 MPa. Preferably the liquid electrolyte has an osmotic pressure from 1.2 to 70 MPa, more preferably from 2.5 to 50 MPa, more preferably from 3.5 to 40 MPa.

Preferably the liquid electrolyte includes a protic acid. Examples of protic acids include hydrochloric acid (HCl), chloric acid ($HClO_3$), perchloric acid ($HClO_4$), hydroiodic acid (HI), hydrobromic acid (HBr), nitric acid ($HNO_3$), nitrous acid ($HNO_2$), phosphoric acid ($H_3PO_4$), sulfuric acid ($H_2SO_4$), sulfurous acid ($H_2SO_3$), trifluoromethanesulfonic acid (triflic acid, $CF_3SO_3H$) and combinations. More preferably the liquid electrolyte includes sulfuric acid. The liquid electrolyte may include sulfuric acid at a concentration of at least 0.1 moles per Liter (M). Preferably the liquid electrolyte includes sulfuric acid at a concentration of at least 0.2 M, more preferably at least 0.25 M, more preferably at least 0.3 M, more preferably at least 0.4 M, more preferably at least 0.5 M, more preferably at least 1.0 M, more preferably at least 1.5 M, more preferably at least 3.0 M, more preferably at least 4.0 M, and more preferably at least 5.0 M. Preferably the liquid electrolyte includes sulfuric acid at a concentration of from 0.25 to 9.0 M, more preferably from 0.5 to 7.0 M, more preferably from 0.75 M to 5.0 M, and more preferably from 1.0 to 3.0 M. The osmotic pressure of a liquid electrolyte that includes a protic acid may be increased further by the addition of non-acidic salts, such as halide, nitrate, sulfate, or triflate salts of alkali metals, alkaline earth metals or combinations.

The cathode 220 includes a gas diffusion electrode (GDE), a cathode catalyst on the GDE, a hydrogel 222 on the catalyst, and optional screen 224 on the hydrogel. The half cell reaction at the cathode is a reaction between a gaseous oxidant and ions from the electrolyte, such as $H^+$ ions. The oxidant may be any substance that can be reduced to a lower oxidation state by the cathode catalyst. Examples of oxidants include molecular oxygen ($O_2$) and ozone. Preferably the oxidant is oxygen, which is preferably present in a flow of air. Examples of cathode catalysts include platinum and combinations of platinum with another metal, such as cobalt, nickel or iron. In one example, the GDE may include a porous carbon substrate, such as teflonized (0-50%) carbon paper of 50-250 micron thickness. A specific example of this type of GDE is Sigracet® GDL 24 BC, available from SGL Carbon AG (Wiesbaden, Germany).

The hydrogel 222 includes an aqueous liquid and a polymer. The polymer is in the form of a network having chemical or physical crosslinks between the polymer chains, and the network is insoluble in the aqueous liquid. When the polymer is contacted with the aqueous liquid, the network swells, forming the hydrogel. Preferably the polymer is chemically resistant to the aqueous liquid and is thermally stable at the temperatures at which the cell may be stored and operated. Preferably the polymer network is insoluble in, and chemically resistant to, any other liquids that may contact the network during storage or operation of the fuel cell.

The polymer of the hydrogel 222 may have an acid capacity less than 0.8 milliequivalents per gram (meq/g). Acid capacity of a polymer is determined by the following test. A known mass of the polymer is titrated with an aqueous solution of NaOH having a known concentration. The value of the equivalents of NaOH needed to neutralize the polymer is divided by the mass of the polymer, to provide the acid capacity. Preferably the polymer has an acid capacity less than 0.7 meq/g, more preferably less than 0.6 meq/g, more preferably less than 0.5 meq/g, more preferably less than 0.4 meq/g, more preferably less than 0.3 meq/g, more preferably less than 0.2 meq/g, more preferably less than 0.1 meq/g, more preferably less than 0.05 meq/g, more preferably less than 0.01 meq/g, more preferably less than 0.001 meq/g.

The polymer of the hydrogel 222 may include acid groups covalently bound to the polymer, such as carboxylic acid groups, phosphoric acid groups and/or sulfonic acid groups. In one example, the polymer may include sulfonic acid groups covalently bound to the polymer, provided the polymer has an acid capacity less than 0.8 meq/g. Polymers including sulfonic acid groups covalently bound to the polymer may include monomer units derived from monomers such as styrene sulfonic acid, vinyl sulfate, sulfonated perfluoro(alkyl vinyl ether), 2-acrylamido-2-methyl-1-propanesulfonic acid (AMPS), 2-methyl-2-propene sulfonic acid, 2-sulfopropyl methacrylate, and 3-sulfopropyl acrylate. In another example, the polymer may include carboxylic acid groups covalently bound to the polymer. Preferably the acid capacity of a polymer that includes carboxylic acid groups is less than 0.8 meq/g. Polymers including carboxylic acid groups covalently bound to the polymer may include monomer units derived from monomers such as acrylic acid, methacrylic acid, itaconic acid, and glutamic acid. In another example, the polymer may be a polymer that has been functionalized with acid groups after polymerization, such as an acid-functionalized polymer containing aromatic groups in the polymer chain.

The polymer of the hydrogel 222 may include base groups covalently bound to the polymer, such as amine groups, ammonium groups, imine groups, and pyridine groups. For example, the polymer may include monomer units derived from monomers such as vinyl pyridine, ethylene imine, vinylamine, vinylaniline, acryloxyethyltrimethyl ammonium chloride, N,N-diallyidimethylammonium chloride, or (3-acrylamidopropyl) trimethylammonium chloride. In another example, the polymer may be a polymer that has been functionalized with base groups after polymerization, such as a base-functionalized polymer containing aromatic groups in the polymer chain. These base groups may be present instead of, or in addition to, acid groups covalently bound to the polymer. A polymer that has no acid groups covalently bound to the polymer has an acid capacity of 0 meq/g. Preferably the polymer has no acid groups covalently bound to the polymer.

The polymer of the hydrogel 222 may include neither acid groups nor base groups. Such a neutral polymer is preferably hydrophilic, to ensure that the polymer network swells in the aqueous liquid. A hydrophilic polymer is a polymer that, in the absence of chemical or physical crosslinking between the polymer chains, has a solubility in water greater than 10 percent by weight (wt %) at 25° C. Examples of neutral hydrophilic polymers include poly(vinyl alcohol) (PVA), poly(hydroxyethyl methacrylate) (pHEMA), poly(N-vinyl pyrrolidone) (PVP), poly(ethylene oxide) (PEO), poly(ethylene glyclol) (PEG), poly(propylene oxide) and poly(methyl vinyl ether) (PMVE). Examples of neutral hydrophilic polymers also include cellulose and ethers and esters of cellulose, such as hydroxyethyl cellulose (HEC), hydroxypropyl cellulose (HPC), hydroxyethyl methyl cellulose (HEMC), hydroxypropyl methyl cellulose (HPMC). A neutral polymer has an acid capacity of 0 meq/g. Preferably the polymer has no acid groups covalently bound to the polymer.

A neutral hydrophilic polymer may include some monomer units that are hydrophilic and some monomer units that are hydrophobic. A monomer unit is hydrophilic if a non-crosslinked polymer containing only that monomer unit has a solubility in water greater than 10 wt % at 25° C. A monomer unit is hydrophobic if a non-crosslinked polymer containing only that monomer unit has a solubility in water of at most 10 wt % at 25° C. Examples of hydrophilic monomers include acrylamide and methacrylamide based monomers, such as acrylamide, N,N-dimethyl acrylamide, N-methyl acrylamide, N-ethyl acrylamide, N-isopropyl acrylamide, diacetone acrylamide and hydroxymethyl acrylamide; hydroxyalkyl acrylates and hydroxyalkyl methacrylates, such as hydroxyethyl methacrylate, hydroxyethyl acrylate and 4-t-butyl-2-hydroxycyclohexyl methacrylate; polyalkoxyl acrylates and polyalkoxyl methacrylates, such as polyethyleneglycol acrylates and polyethyleneglycol methacrylates; N-vinylpyrrolidinone; and N-vinylformamide. Examples of hydrophobic monomers include branched or linear $C_1$-$C_{18}$ alkyl vinyl ethers, vinyl esters, acrylamides, acrylates and methacrylates. Specific examples of these types of hydrophobic monomers include butyl acrylate, 2-ethylhexyl acrylate, ethyl acrylate, lauryl acrylate, hexadecyl acrylate and methacrylate analogs of these alkyl acrylates. Examples of hydrophobic monomers also include olefins such as ethylene, propylene, butene, isoprene and styrene, including fluorinated derivatives of these. Hydrophilic and hydrophobic monomer units may also be present in polymers that include acid and/or base groups covalently bound to the polymer.

The aqueous liquid in the hydrogel 222 may be an electrolyte. An electrolyte liquid in the hydrogel 222 may be any aqueous mixture of ions. Preferably the aqueous liquid has an osmotic pressure of at least 1.2 MPa. More preferably the aqueous liquid has an osmotic pressure of at least 2.5 MPa, more preferably of at least 3.5 MPa, more preferably of at least 10 MPa, more preferably of at least 15 MPa, more preferably of at least 20 MPa, and more preferably of at least 25 MPa. Preferably the aqueous liquid has an osmotic pressure from 1.2 to 70 MPa, more preferably from 2.5 to 50 MPa, more preferably from 3.5 to 40 MPa.

Preferably the aqueous liquid in the hydrogel 222 includes a protic acid. Examples of protic acids include hydrochloric acid (HCl), chloric acid ($HClO_3$), perchloric acid ($HClO_4$), hydroiodic acid (HI), hydrobromic acid (HBr), nitric acid ($HNO_3$), nitrous acid ($HNO_2$), phosphoric acid ($H_3PO_4$), sulfuric acid ($H_2SO_4$), sulfurous acid ($H_2SO_3$), trifluoromethanesulfonic acid (triflic acid, $CF_3SO_3H$) and combinations. More preferably the liquid includes sulfuric acid. The aqueous liquid may include sulfuric acid at a concentration of at least 0.25 M. Preferably the aqueous liquid includes sulfuric acid at a concentration of at least 0.5 M, more preferably at least 1.0 M, more preferably at least 1.5 M, more preferably at least 3.0 M, more preferably at least 4.0 M, and more preferably at least 5.0 M. Preferably the aqueous liquid includes sulfuric acid at a concentration of from 0.25 to 9.0 M, more preferably from 0.5 to 7.0 M, more preferably from 0.75 M to 5.0 M, and more preferably from 1.0 to 3.0 M. The osmotic pressure of an aqueous liquid that includes a protic acid may be increased further by the addition of non-acidic salts, such as halide, nitrate, sulfate, or triflate salts of alkali metals and alkaline earth metals or combinations.

It has been surprisingly found that, when a hydrogel as described above is on the cathode of a fuel cell, the amount of water at the cathode during operation of the fuel cell can be decreased relative to a similar fuel cell having a hydrogel that includes a polymer such as Nafion® (DuPont; Wilmington, Del.). Nafion® is a copolymer of tetrafluoroethylene and sulfonated perfluoro(alkyl vinyl ethers) that includes sulfonic acid groups covalently bound to the polymer, specifically in the form of perfluorosulfonic acid groups, and has an acid capacity of at least 0.9 meq/g. Nafion® is a typical PEM in conventional fuel cells, and is widely used in the fuel cell industry. One possible explanation for this phenomenon is that a polymer having an acid capacity less than 0.8 meq/g provides for a lower electro-osmotic drag when protons are transported through the hydrogel to the cathode. Fewer protons are ionically associated with acid groups on a polymer having a lower acid capacity. Thus, the protons can move more freely, without being associated with water molecules at the polymer surface.

Polymers including carboxylic acid groups or phosphoric acid groups covalently bound to the polymer may have an acid capacity greater than 0.8 meq/g, while still providing for a reduced electro-osmotic drag. One possible explanation for this is that sulfonic acid groups are strong acids, whereas carboxylic acid groups and phosphoric acid groups are weak acids. Thus, at a given pH of liquid in a hydrogel that includes the polymer, a polymer having carboxylic acid or phosphoric acid groups will associate more weakly with protons in the liquid than will a polymer having sulfonic acid groups, even through the polymers may have similar acid capacity values. Preferably the polymer of the hydrogel includes no sulfonic acid groups covalently bound to the polymer.

Optional screen 224 may be present at the interface between the channel 240 and the hydrogel 222. The optional screen may provide for a physical stabilization of the hydrogel. This physical stabilization may be desirable for fuel cells that are sealed by compression of the cell. Although the polymer of the hydrogel is crosslinked, it may still flow or creep under pressure, resulting in a lack of uniformity of the channel cross-section. The screen may be made of any porous rigid material, for example metal, glass, ceramic or plastic. In one example, the optional screen includes a stainless steel mesh.

The electroactive area of the cathode 220 preferably is protected from direct bulk contact with the liquid electrolyte 230 by the hydrogel 222. Preferably, the hydrogel is a hydraulic barrier, which blocks the bulk hydraulic flow of liquid electrolyte into the cathode, but permits transport of water and ions between the liquid electrolyte and the cathode. The transport of ions provides the reactant to the cathode that is necessary to complete the cell reaction with the oxidant.

The oxidant supplied to the cathode may be a stream of air or gaseous oxygen. For an oxidant channel 260 having an oxidant outlet 264, maintaining an adequate pressure at the outlet may provide for essentially one-way diffusion of oxidant through the GDE of cathode 220. When pure oxygen is used as the gaseous oxidant, no depleted oxidant is formed. Thus, an oxidant outlet may be unnecessary, and the oxidant channel 260 may be closed off or may terminate near the end of cathode 220. However, an outlet 264 for the oxidant channel may be useful to remove reaction products, such as water.

It is desirable for the oxidant pressure to be low, so that a compressor is not required for the oxidant. Compressors can be highly parasitic of the power generated by the fuel cell. Preferably the oxidant pressure is no greater than 15 pounds per square inch (psi; 0.10 MPa). More preferably the oxidant pressure is no greater than 10 psi (0.07 MPa), and more preferably is no greater than 5 psi (0.035 MPa). The oxidant flow rate may be expressed in terms of stoichiometric units, referred to herein as a "stoich". A "stoich" is defined as the volumetric flow rate of oxidant required to supply a stoichiometric amount of the oxidant to the cathode. This flow rate increases as the current density of the cell increases and is thus dependent on the current density of the cell. Preferably the flow rate of the oxidant is from 1 to 10 stoich, more preferably from 1.2 to 5 stoich, and more preferably from 1.5 to 3 stoich.

The anode 210 includes an anode catalyst, so that a half cell reaction may take place at the anode. The half cell reaction at the anode in a fuel cell typically produces electrons and protons. The electrons produced provide an electric potential in a circuit connected to the fuel cell. Examples of anode catalysts include platinum, and combinations of platinum with another metal, such as ruthenium, tin, osmium or nickel. The anode also may include a porous conductor, such as a GDE.

The fuel may be any substance that can be oxidized to a higher oxidation state by the anode catalyst. Examples of fuels include hydrogen, oxidizable organic molecules, ferrous sulfate, ferrous chloride, and sulfur. Oxidizable organic molecules that may be used as fuels in a fuel cell include organic molecules having only one carbon atom. Oxidizable organic molecules that may be used as fuels in a fuel cell include organic molecules having two or more carbons but not having adjacent alkyl groups, and where all carbons are either part of a methyl group or are partially oxidized. Examples of such oxidizable organic molecules include methanol, formaldehyde, formic acid, glycerol, ethanol, isopropyl alcohol, ethylene glycol and formic and oxalic esters thereof, oxalic acid, glyoxylic acid and methyl esters thereof, glyoxylic aldehyde, methyl formate, dimethyl oxalate, and mixtures thereof. Preferred fuels include gaseous hydrogen, gaseous pure methanol, liquid pure methanol and aqueous mixtures of methanol, including mixtures of methanol and an electrolyte.

In an example of fuel cell 200, the anode 210 is in contact with fuel channel 250. A fuel composition flows through the channel from fuel inlet 252 to fuel outlet 254, contacting the catalyst of the anode to form protons and electrons. The fuel composition may contain a fuel. In another example of fuel cell 200, the anode 210 is in contact with fuel channel 250, and the fuel is supplied to the anode as a stream of gaseous hydrogen or methanol. In this example, the anode 210 includes a GDE, and maintaining an adequate gas pressure at the outlet 254 may provide for essentially one-way diffusion of fuel through the GDE. When pure hydrogen or methanol is used as the gaseous fuel, no depleted fuel is formed. Thus, a fuel outlet may be unnecessary, and the fuel channel 250 may be closed off or may terminate near the end of anode 210. However, in this example, an outlet 254 for the fuel channel may be useful to remove gaseous reaction products, such as $CO_2$.

In another example of fuel cell 200, fuel channel 250 is not present, the fuel instead being in the liquid electrolyte 230. The fuel in the liquid electrolyte contacts the catalyst of the anode to form protons and electrons. The liquid electrolyte may contain a fuel such as methanol. One potential complication of this example is that there is an increased risk of fuel crossover to the cathode 220, relative to a fuel cell having the anode positioned between the fuel composition and the liquid electrolyte. This risk may be minimized by the presence of the hydrogel 222 between the cathode catalyst and the liquid electrolyte and/or by using two liquid streams within the liquid electrolyte.

The electroactive area of the anode may be protected from direct bulk contact with the liquid electrolyte 230 by optional blocking layer 212. Examples of optional blocking layers include inorganic networks, such as porous ceramics, zeolites and catalyst layers; organic networks, such as carbon tubes and crosslinked gels; membranes, such as microfiltration membranes, ultrafiltration membranes, nanofiltration membranes and ion-exchange membranes; and combinations of inorganic networks, organic networks and/or membranes, such as inorganic/organic composites. Preferably the blocking layer has a total thickness of 100 microns or less. If a blocking layer is too thick or too hydrophobic to maintain proton and water transport rates in either direction, the fuel cell can suffer resistive losses that inhibit performance of the fuel cell.

In one example, an optional blocking layer includes a membrane, such as a permeable polymeric material that restricts the transport of at least one chemical substance. See, for example, Baker, R. W. "Membrane Technology," *Encyclopedia of Polymer Science and Technology*, Vol. 3, pp. 184-248 (2005). For example, the blocking layer may include a membrane separator that is typically used between the electrodes of a fuel cell, a battery, or a redox flow cell. These membrane separators include polymer electrolyte membranes (PEM), which may be cation-exchange membranes or anion-exchange membranes. Examples of PEMs that may be used as a blocking layer include polymers and copolymers derived at least in part from perfluorosulfonic acid, such as Nafion®, Aciplex® S1004 (Asahi Chemical Industry Company; Tokyo, Japan), XUS-13204 (Dow Chemical Company; Midland, Mich.), and GORE-SELECT® (W. L. Gore; Elkton, Md.). These membrane separators also include non-ionic polymers, such as expanded poly(tetrafluoroethylene) (i.e. GORE-TEX®, W. L. Gore); expanded polyethylene; aromatic polymers such as polyphenylene oxide (PPO), polyphenylene sulfide (PPS), polyphenylene sulfone, poly (etheretherketone) (PEEK), polybenzimidazole (PBI), polybenzazoles, polybenzothiazoles, polyimides, and fluorinated polystyrene; and inorganic-organic polymers, such as polyphosphazenes and poly(phenylsiloxanes). Non-ionic membrane separators typically serve as a matrix to hold the electrolyte between the two electrodes, and may be doped with acid electrolyte to become proton conducting. The acid electrolyte may be a liquid electrolyte or a solid electrolyte, such as a polymer electrolyte. These non-ionic membrane separators may be functionalized with acid groups or ammonium groups to form cation-exchange membranes or anion-exchange membranes.

The channel 240 may be one of a plurality of channels between the anode 210 and the cathode 220. For example, the liquid electrolyte 230 may be delivered to an area near the anode and/or the cathode of the cell in a manifold, and then distributed into multiple channels that traverse the electrode (s). Each of these channels may be a microfluidic channel having a dimension less than 500 micrometers. Preferably each channel has a dimension less than 400 micrometers, more preferably less than 300 micrometers, more preferably less than 250 micrometers, more preferably less than 200 micrometers, more preferably less than 100 micrometers, more preferably less than 75 micrometers, more preferably less than 50 micrometers, more preferably less than 25 micrometers, and more preferably less than 10 micrometers.

For a liquid electrolyte 230 that passes through the cell in more than one microfluidic channel, the flow rate in an individual channel may be from 0.01 milliliters per minute (mL/min) to 10 mL/min. Preferably the flow rate of the liquid electrolyte is from 0.1 to 1.0 mL/min, and more preferably is from 0.2 to 0.6 mL/min. The flow rate of the flowing electrolyte may also be expressed in units such as centimeters per minute (cm/min). Preferably the flow rate of the liquid electrolyte is at least 10 cm/min, more preferably at least 50 cm/min, and more preferably at least 100 cm/min. Preferably the liquid electrolyte is transported in an individual channel at a rate of from 10 to 1,000 cm/min, more preferably from 50 to 500 cm/min, and more preferably from 100 to 300 cm/min. Preferably the flow rate of the liquid electrolyte is high enough to displace $CO_2$ bubbles that may form at the anode due to the oxidation of fuel.

The liquid electrolyte 230 preferably passes through a microfluidic channel in a laminar flow. The term "laminar flow" means the flow of a liquid with a Reynolds number less than 2,300. The Reynolds number ($R_e$) is a dimensionless quantity defined as the ratio of inertial forces to viscous forces, and can be expressed as:

$$R_e = (\rho v L)/\mu$$

where L is the characteristic length in meters, $\rho$ is the density of the fluid (g/cm$^3$), v is the linear velocity (m/s), and $\mu$ is the viscosity of the fluid (g/(s cm)). Laminar flow of the liquid electrolyte may include flow of the electrolyte in a microfluidic channel together with a gaseous phase in the channel, such as a phase containing a gaseous reaction product, such as $CO_2$.

During operation of fuel cell 200, the liquid electrolyte 230 has an osmotic pressure that is greater than the osmotic pressure of the liquid water produced and/or accumulating at the cathode 220. This difference in osmotic pressure imposes a fluid pressure that may be greater than, and in a direction opposite to, the electro-osmotic drag typically produced in a fuel cell. Thus, there is a driving force for transport of water from the cathode into the electrolyte. Rather than water building up at the cathode at a rate greater than the rate at which it can be removed by an oxidant gas flow, water at the cathode may be transported by osmosis into the liquid electrolyte. Excess water may be at least partially recovered, and may be recycled back to the anode.

Preferably the difference between the osmotic pressure of the liquid electrolyte 230 and the osmotic pressure of the water at the cathode 220 is at least 1 MPa. More preferably the difference between the osmotic pressure of the liquid electrolyte and the osmotic pressure of the liquid water at the cathode is at least 1.2 MPa, more preferably is at least 2.5 MPa, more preferably is at least 3.5 MPa, more preferably is at least 10 MPa, more preferably is at least 15 MPa, more preferably is at least 20 MPa, and more preferably is at least 25 MPa. Preferably the difference between the osmotic pressure of the liquid electrolyte and the osmotic pressure of the water at the cathode is from 1 to 70 MPa. More preferably the difference between the osmotic pressure of the liquid electrolyte and the osmotic pressure of the water at the cathode is from 1.2 to 70 MPa, more preferably from 2.5 to 50 MPa, and more preferably from 3.5 to 40 MPa.

Preferably the fluid pressure created in opposition to the electro-osmotic drag is not of a magnitude that would prevent the flow of solvated ions through the hydrogel 222 toward the cathode catalyst. This fluid pressure is related to the difference in osmotic pressure, which is dependent on the osmotic pressure of the liquid electrolyte and of the liquid water within the catalyst layer. Thus, adequate ion flux to maintain the reaction at the cathode can be ensured by controlling the concentration of the liquid electrolyte and the water transport capabilities of the blocking layer. Preferably the liquid electrolyte can act as a buffer, so that fluctuations in the water content of the liquid electrolyte do not cause drastic changes in the osmotic pressure of the liquid electrolyte. In one example, the volume of liquid electrolyte in a holding chamber may be such that the liquid electrolyte volume can change until the osmotic pressure of the liquid electrolyte is great enough to recover the requisite product water to operate at water neutral conditions.

Figure 3:
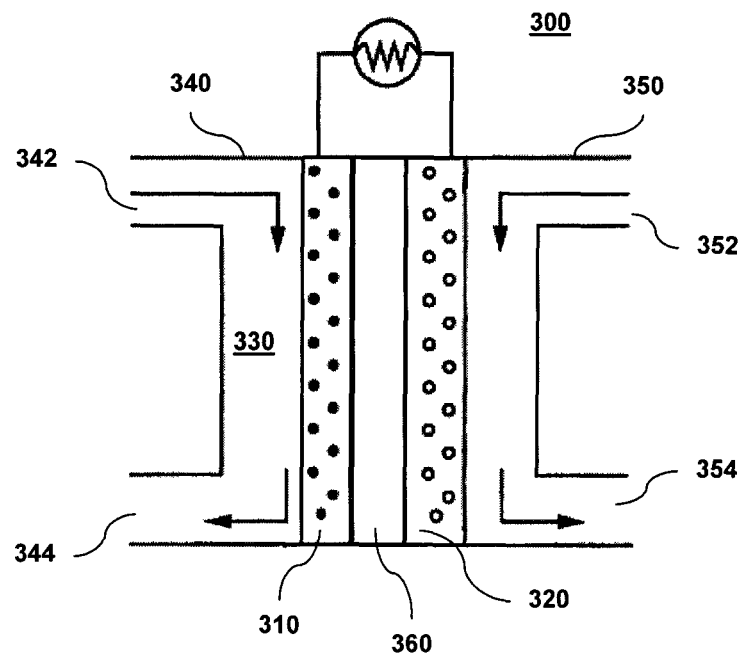
FIG. 3 is a schematic representation of a fuel cell having a liquid electrolyte and a hydrogel, where the hydrogel is in contact with the anode and the cathode.

FIG. 3 represents an example of a fuel cell 300 that includes an anode 310, a cathode 320, a liquid electrolyte 330, and a hydrogel 360. The anode 310 has first and second surfaces, and the first surface is in contact with the hydrogel 360. The second surface of anode 310 is in contact with a fuel channel 340, including a fuel inlet 342 and a fuel outlet 344. The liquid electrolyte 330 contains a fuel and flows in the fuel channel 340. The cathode 320 includes a GDE, and has first and second surfaces. The first surface of cathode 320 is in contact with an oxidant channel 350, including an oxidant inlet 352 and optional oxidant outlet 354, and the second surface of cathode 320 is in contact with the hydrogel 360. Preferably the oxidant pressure in the oxidant channel 350 is no greater than 0.14 MPa, more preferably is no greater than 0.10 MPa, and more preferably is no greater than 0.07 MPa. The hydrogel 360 includes an aqueous liquid and a polymer, as described for hydrogel 222 in the example of FIG. 2.

Figure 4:
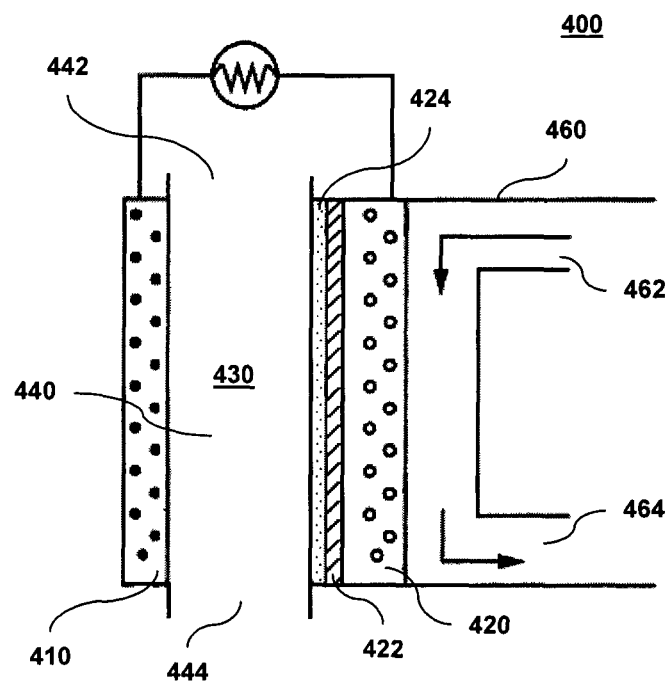
FIG. 4 is a schematic representation of a fuel cell having a liquid electrolyte and a hydrogel, where an electrolyte/fuel mixture passes between the anode and the cathode.

FIG. 4 represents an example of a fuel cell 400 that includes an anode 410, a cathode 420 including a hydrogel 422, and a liquid electrolyte 430 containing a fuel. The liquid electrolyte 430 is in a channel 440 having an electrolyte inlet 442 and an electrolyte outlet 444. The channel 440 is contiguous with the anode 410 and the cathode 420. The cathode 420 includes a GDE, and has first and second surfaces. The first surface of cathode 420 is in contact with an oxidant channel 460, including an oxidant inlet 462 and optional oxidant outlet 464. The second surface of cathode 420 is in contact with the channel 440, and may include optional screen 424. The hydrogel 422 includes an aqueous liquid and a polymer, as described for hydrogel 222 in the example of FIG. 2.

Figure 5:
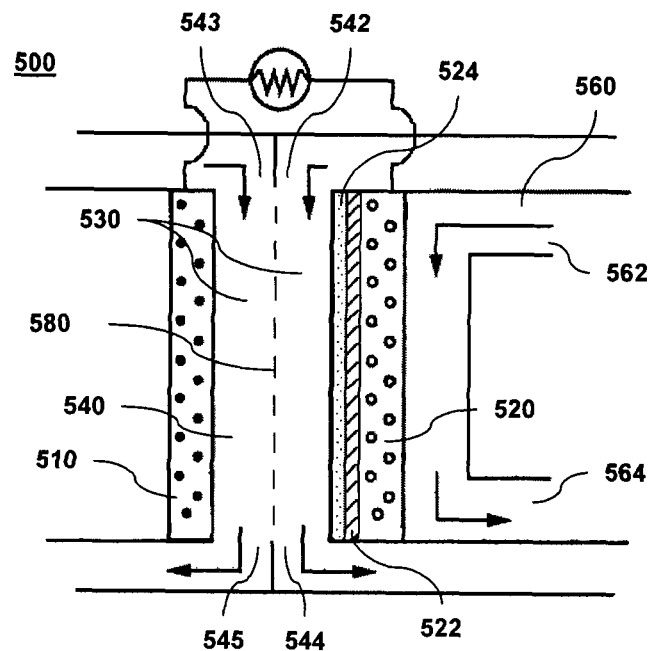
FIG. 5 is a schematic representation of a fuel cell having a liquid electrolyte and a hydrogel, where the liquid electrolyte includes two electrolyte streams.

FIG. 5 represents an example of a fuel cell 500 that includes an anode 510, a cathode 520 including a hydrogel 522, and a liquid electrolyte 530. The liquid electrolyte 530 is in a channel 540 having a first electrolyte inlet 542, a second electrolyte inlet 543, a first electrolyte outlet 544 and a second electrolyte outlet 545. The channel 540 is contiguous with the anode 510 and the cathode 520. The cathode 520 includes a GDE, and has first and second surfaces. The first surface of the cathode 520 is in contact with an oxidant channel 560, including an oxidant inlet 562 and optional oxidant outlet 564. The second surface of cathode 520 is in contact with the channel 540, and may include optional screen 524. The fuel cell during operation optionally may be characterized by an induced dynamic conducting interface (IDCI) 580. The hydrogel 522 includes an aqueous liquid and a polymer, as described for hydrogel 222 in the example of FIG. 2.

When fuel cell 500 is operating, the liquid electrolyte 530 includes two streams. The first stream flows in the channel 540 between the first inlet 542 and the first outlet 544 and is in contact with the cathode 520. The second stream flows in the channel 540 between the second inlet 543 and the second outlet 545 and is in contact with the anode 510. When entering through the first inlet 542, the first stream does not contain a fuel. When entering through the second inlet 543, the second stream contains a mixture of an electrolyte and a fuel. The composition of the first stream and of the electrolyte portion of the second stream may be the same, or they may be different. Once the first and second streams have exited the cell through the first outlet 544 and the second outlet 545, respectively, each stream independently may be recirculated back to the appropriate inlet. Each stream also independently may be treated to remove any reaction products present in the stream after exiting through the outlet.

The first and second streams may flow through the channel in a laminar flow. A laminar flow fuel cell (LFFC) uses the laminar flow properties of a microfluidic liquid stream to deliver a reagent to one or both electrodes of a fuel cell. In one example of an LFFC (referring to FIG. 5), fuel and oxidant streams flow through the microfluidic channel 540 in laminar flow, such that fluid mixing and fuel crossover is minimized. In this example, the IDCI 580 is present between the two streams, replacing the PEM of a conventional fuel cell. The IDCI can maintain concentration gradients over considerable flow distances and residence times, depending on the dissolved species and the dimensions of the flow channel. IDCI-based LFFC systems are described, for example, in U.S. Pat. No. 6,713,206 to Markoski et al., in U.S. Patent Application Publication 2004/0072047 to Markoski et al., and in U.S. Patent Application Publication 2006/0088744 to Markoski et al.

In an example of fuel cell 500, a first stream may be introduced into the channel 540 through first inlet 542, and a second stream may be introduced into the channel 540 through second inlet 543. The first stream may optionally include an oxidant. The second stream includes a fuel. By pumping the two solutions into the channel 540, parallel laminar flow induces the IDCI 580 that is maintained during fluid flow. If the flow rates of the two fluid streams are kept constant, the IDCI is established directly between anode 510 and cathode 520, completing the electric circuit while keeping the streams from convectively mixing and while keeping the fuel from contacting the cathode. The two flow rates can be varied to locate the laminar flow boundary closer to the anode 510 or to the cathode 520 if desired.

One possible disadvantage of IDCI-based LFFCs is the need to keep the cells physically stable. Tilting or jolting of an IDCI-based LFFC may flip or twist the liquid streams, causing the fuel and oxidant to come in contact with the wrong electrode and leading to crossover, catastrophic failure, and/or cell reversal until the stable fluid flow can be restored. This disadvantage may be reduced or eliminated with the presence of a porous separator between the streams.

Figure 6:
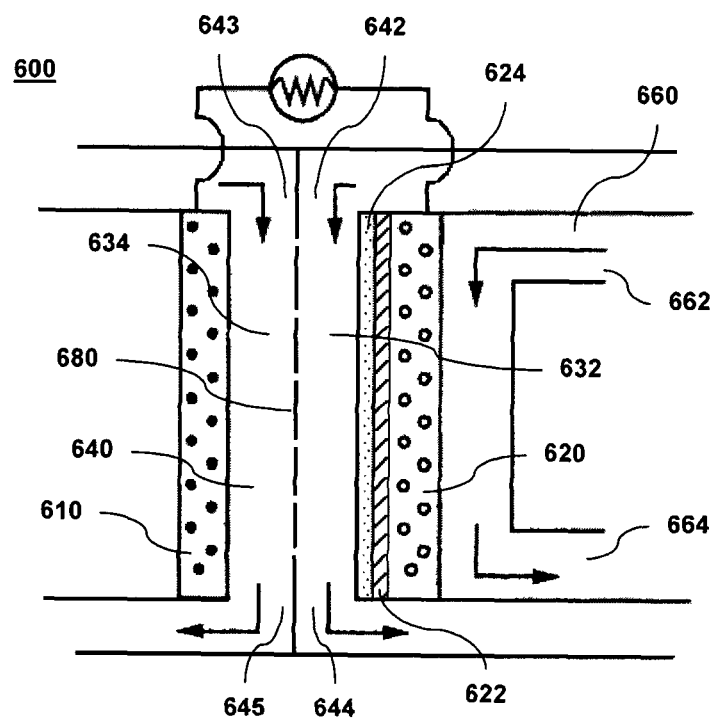
FIG. 6 is a schematic representation of a fuel cell having a liquid electrolyte, a hydrogel, and a porous separator.

FIG. 6 represents an example of a fuel cell 600 that includes an anode 610, a cathode 620 including a hydrogel 622, a porous separator 680, and a liquid electrolyte having a first liquid stream 632 and a second liquid stream 634 on either side of the porous separator 680. The liquid electrolyte is in a channel 640 having a first electrolyte inlet 642, a second electrolyte inlet 643, a first electrolyte outlet 644 and a second electrolyte outlet 645. The channel 640 is contiguous with the anode 610 and the cathode 620. The cathode 620 includes a GDE, and has first and second surfaces. The first surface of the cathode 620 is in contact with an oxidant channel 660, including an oxidant inlet 662 and optional oxidant outlet 664. The second surface of cathode 620 is in contact with the channel 640, and may include optional screen 624. The hydrogel 622 includes an aqueous liquid and a polymer, as described for hydrogel 222 in the example of FIG. 2.

The porous separator 680 separates different streams, allowing them to be directed in different directions, and is useful for keeping oxidant, fuel, and/or electrolyte streams separate for subsequent recycling. Thus, the flow boundaries of the streams are not dependent on the flow rate of the fluids. The porous separator achieves this goal without interfering significantly with ion transport between the streams. The porous separator is hydrophilic, so the fluid within the streams is drawn into the pores by capillary action. The two streams of fluid on either side of the separator are thus in direct contact, allowing ion transport between the two streams. When the pores are small and the total area of the pores is a small percentage of the total area of the porous separator, mass transfer of fluid from one stream to the other is very small, even if there is a significant difference in pressure between the streams and across the separator. This lack of mass transfer may provide for a decrease in fuel crossover. Examples of porous separators and their use in electrochemical cells are disclosed in U.S. Patent Application Publication 2006/0088744 to Markoski et al.

Figure 7:
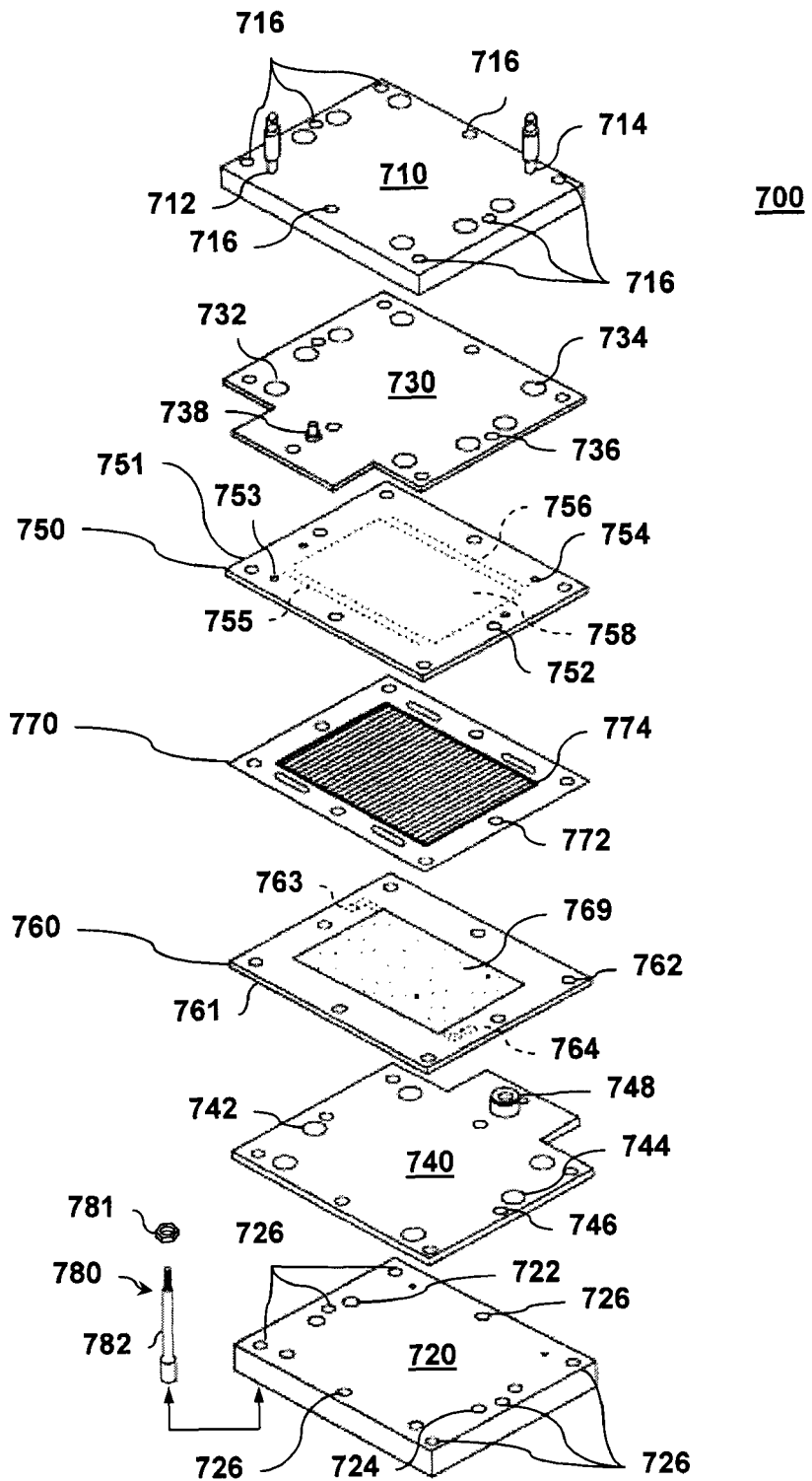
FIG. 7 is a representation of a fuel cell including a liquid electrolyte and a hydrogel.
Figure 7A:
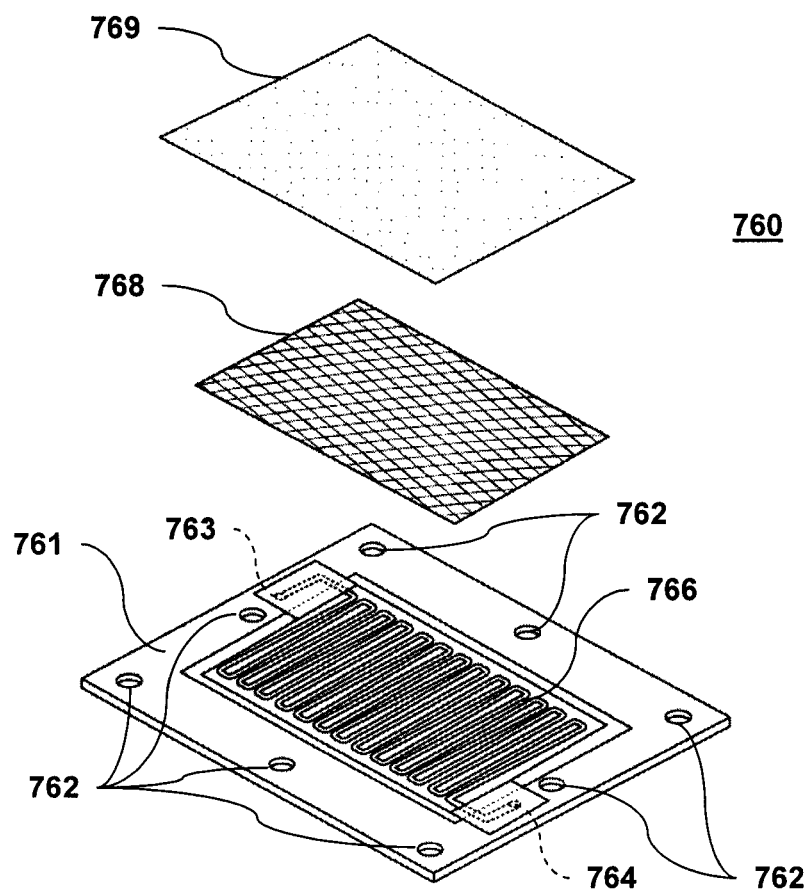
FIG. 7A is a representation of the cathode plate 760 of FIG. 7.

FIGS. 7 and 7A together are an exploded perspective representation of an example of a microfluidic fuel cell 700 that includes a liquid electrolyte and a hydrogel. Fuel cell 700 includes back plates 710 and 720, current collectors 730 and 740, anode plate 750, cathode plate 760, microfluidic channel layer 770, and through-bolts 780. Back plate 710 includes an electrolyte inlet 712, an electrolyte outlet 714, and eight bolt holes 716 for through-bolts 780. Back plate 720 includes a gas inlet 722, a gas outlet 724, and eight bolt holes 726 for through-bolts 780. The back plates 710 and 720 may be any rigid material, and preferably are electrically insulating. Examples of back plate materials include plastics such as polycarbonates, polyesters, and polyetherimides. The through-bolts 780 include nuts 781, and may include optional insulating sleeves 782.

Current collector 730 includes electrolyte holes 732 and 734, bolt holes 736 (only one labeled in FIG. 7), and electrical connector 738. Current collector 740 includes gas holes 742 and 744, bolt holes 746 (only one labeled in FIG. 7), and electrical connector 748. The current collectors 730 and 740 may include any conducting material, for example metal, graphite, or conducting polymer. The current collectors preferably are rigid, and may include an electrically insulating substrate and an electrically conductive layer on the substrate. Examples of current collector materials include copper plates, gold plates, and printed circuit boards coated with copper and/or gold.

The anode plate 750 includes a conductive plate 751 having bolt holes 752 (only one labeled in FIG. 7), electrolyte inlet 753, electrolyte outlet 754, inlet manifold 755, outlet manifold 756, and anode 758. The conductive plate 751 may include any conducting material, for example metal, graphite, or conducting polymer. Preferably the conductive plate 751 is rigid. Examples of conductive plate materials include graphite, stainless steel and titanium. Electrolyte inlet 753 is in fluid communication with inlet manifold 755, and electrolyte outlet 754 is in fluid communication with outlet manifold 756. Anode 758 includes a mixture of anode catalyst and binder. The anode may be formed, for example, by depositing a catalyst ink containing the anode catalyst and the binder directly to the conductive plate 751. Preferably the length of the anode is at least equal to the length of the manifolds 755 and 756.

FIG. 7A is an exploded perspective representation of the cathode plate 760. The cathode plate 760 includes a conductive plate 761 having bolt holes 762 (only one labeled in FIG. 7), gas inlet 763, gas outlet 764, gas flow channel 766, cathode 768 and optional screen 769. The conductive plate 761 may include any conducting material, for example metal, graphite, or conducting polymer. Preferably the conductive plate 761 is rigid. Examples of conductive plate materials include graphite, stainless steel and titanium. The gas inlet 763 and gas outlet 764 are in fluid communication through gas flow channel 766.

The cathode 768 preferably includes a GDE, a cathode catalyst on the GDE, and a hydrogel on the catalyst. Optional screen 769 overlays the cathode 768 and the gas flow channel 766. It is preferable to include screen 769 if the hydrogel may flow or creep when the cell is sealed. The hydrogel includes an aqueous liquid and a polymer, as described for hydrogel 222 in the example of FIG. 2.

The microfluidic channel layer 770 is a non-compressible film having bolt holes 772 (only one labeled in FIG. 7) and a channel pattern 774 that includes multiple spaces parallel with the width of the layer. The channel pattern 774 overlays the manifolds 755 and 756 and the anode 758, and provides part of the microfluidic channel structure. The thickness of the film and the width of the spaces in the pattern 774 define the dimensions of the microfluidic channels for the flowing electrolyte. The top and bottom of the microfluidic channels are provided by the anode on one side, and by the cathode plate on the other side. Preferably the microfluidic channel layer is electrically and ionically insulating. The term "ionically insulating" means that a material does not conduct ions. Examples of non-compressible film materials include polycarbonates, polyesters, polyphenylene oxide (PPO), polyphenylene sulfide (PPS), poly(etheretherketone) (PEEK), polybenzimidazole (PBI), polyimides including polyetherimide, high-density polyethylene, and poly(tetrafluoroethylene).

The cell 700 may be assembled by combining the back plates 710 and 720, the current collectors 730 and 740, the anode plate 750, the cathode plate 760 and the microfluidic channel layer 770, such that the microfluidic channel layer is sandwiched between the anode plate and the cathode plate. Optional adhesive or sealing layers (not shown) may be present between the anode plate 750 and the microfluidic channel layer 770 and/or between the cathode plate 760 and the microfluidic channel layer 770. Seals such as o-rings or gaskets may be present, such as at one or more of the holes for the electrolyte and gas inlets and outlets. A through-bolt 780 is placed through each aligned bolt hole, and each bolt is secured at the end with a nut 781.

The cell 700 may be operated by connecting the hole 712 to an electrolyte supply, connecting the hole 714 to an electrolyte outlet, connecting the hole 722 to a gas supply, connecting the hole 724 to a gas outlet, and connecting electrical collectors 738 and 748 to an electrical circuit. When an electrolyte containing a fuel is circulated through the electrolyte inlet and outlet, and a gas containing an oxidant is circulated through the gas inlet and outlet, an electric potential is generated, and current flows through the electrical circuit in proportion to the external load.

In one example, fuel cell 700 may be modified to use two electrolytes. For example, the back plate 720 and current collector 740 may be modified to include an electrolyte inlet and an electrolyte outlet, and the cathode plate 760 may be modified to include an inlet and an outlet for the electrolyte, and an inlet manifold and an outlet manifold on either side of the gas flow channel 766. The modified cell may be operated by flowing an electrolyte/fuel mixture across the anode plate 750, flowing an electrolyte without fuel across the cathode plate 760, and flowing an oxidant gas through flow channel 766. Moreover, the microfluidic channel layer 770 may be modified to include a porous layer to separate the two electrolyte streams. For example, the microfluidic layer 770 may be a 3-ply laminate of a porous layer between two Kapton® layers, where the Kapton® layers each have a laser machined channel pattern 774.

Fuel cells including a liquid electrolyte and a hydrogel may produce at least 0.1 milliamps per square centimeter (mA/$cm^2$). Preferably these fuel cells produce at least 1 mA/$cm^2$, more preferably at least 2 mA/$cm^2$, more preferably at least 10 mA/$cm^2$, more preferably at least 50 mA/$cm^2$, more preferably at least 100 mA/$cm^2$, more preferably at least 400 mA/$cm^2$, and more preferably at least 1000 mA/$cm^2$, including 100-1000 mA/$cm^2$, 200-800 mA/$cm^2$, and 400-600 mA/$cm^2$. These fuel cells may operate at voltages of from 1.0 to 0.1 volts (V) for single cells. Preferably these fuel cells operate at voltages of from 0.7 to 0.2 V, and more preferably from 0.5 to 0.25 V for single cells.

Fuel cells including a liquid electrolyte and a hydrogel preferably produce a current density of 200 mA/$cm^2$ without cathode flooding. The current density at which cathode flooding occurs can be measured by the polarization flooding test, which is performed as follows. A fuel cell is connected to a fuel source and a gaseous oxidant source, and electrically connected to a load. The current density is increased, and the potential is measured under two different oxidant flow regimes. In the stoichiometric flow regime, the oxidant gas flow rate is varied based on the electrical current output of the fuel cell so as to maintain the oxygen concentration at 1-3 times the stoichiometric level for the fuel cell reaction. In the elevated flow regime, the oxidant gas flow rate is set so as to maintain the oxygen concentration at over 5 times the stoichiometric level. No back pressure is applied to the oxidant stream in either regime, and the temperature is maintained at 25° C. The current density at which the measured potential for the stoichiometric flow regime is 10% less than the measured potential for the elevated flow regime for a given oxidant is taken as the onset of cathode flooding. Fuel cells including a liquid electrolyte and a hydrogel preferably produce a current density of 300 mA/$cm^2$ without cathode flooding, more preferably of 400 mA/$cm^2$ without cathode flooding, and more preferably of 500 mA/cm² without cathode flooding, where cathode flooding is measured by the polarization flooding test.

An individual fuel cell including a liquid electrolyte and a hydrogel may be incorporated into a fuel cell stack, which is a combination of electrically connected fuel cells. The fuel cells in a stack may be connected in series or in parallel. The individual fuel cells may have individual electrolyte, fuel and/or oxidant inputs. Two or more of the cells in a stack may use a common source of electrolyte, fuel and/or oxidant. A fuel cell stack may include only one type of fuel cell, or it may include at least two types of fuel cells. Preferably a fuel cell stack includes multiple fuel cells, each having a liquid electrolyte and a hydrogel, where the cells are connected in series, and where the electrolyte, fuel and oxidant are supplied from common sources.

Figure 8:
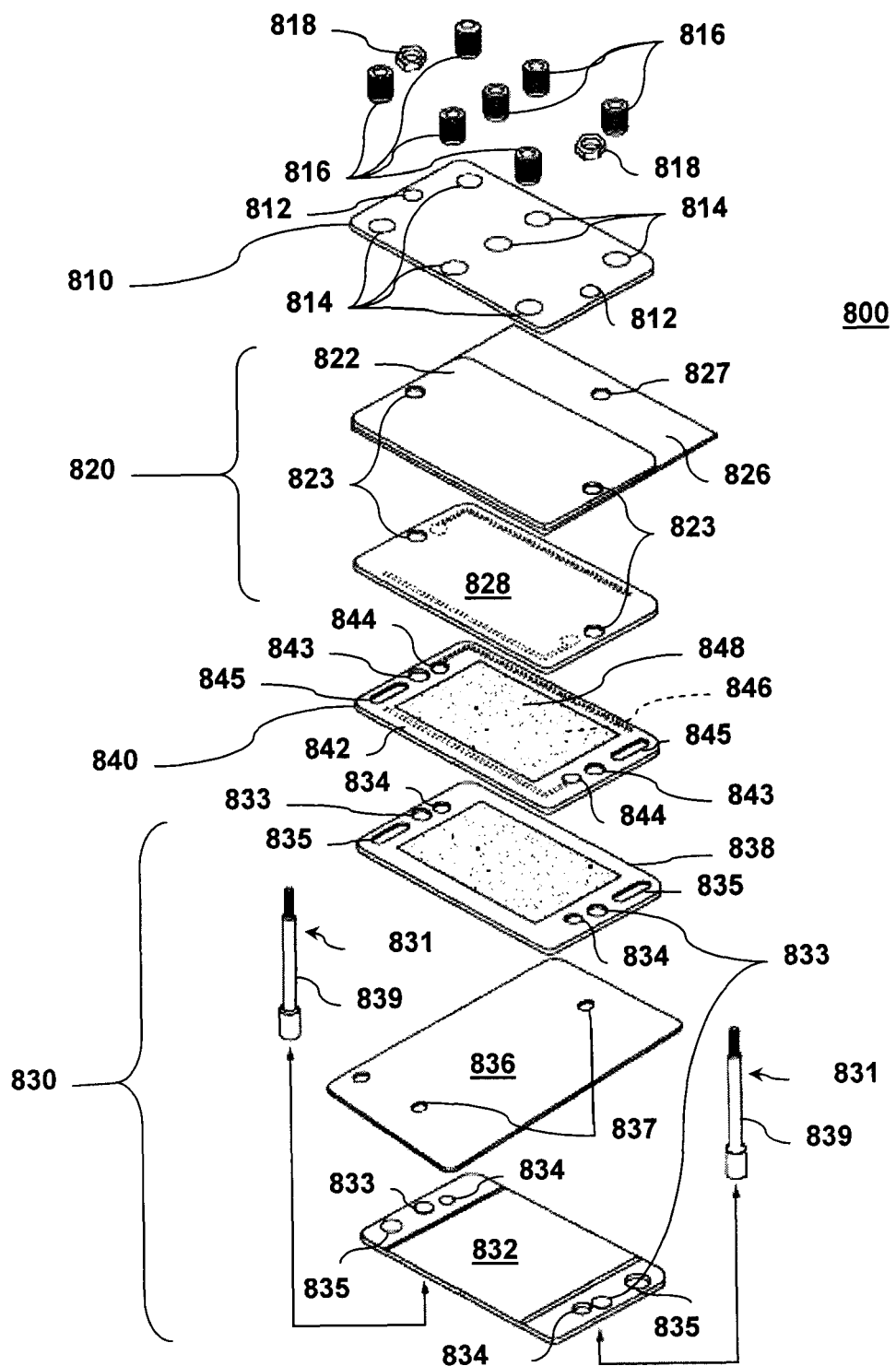
FIG. 8 is a representation of a fuel cell stack including a liquid electrolyte and a hydrogel.

FIG. 8 is an exploded perspective representation of an example of a microfluidic fuel cell stack 800 including microfluidic fuel cells that include a liquid electrolyte and a hydrogel. Fuel cell stack 800 includes a compression plate 810, an anode endplate 820, a cathode endplate 830, and multiple electrode assemblies 840. The compression plate 810 includes holes 812 on either end and includes threaded holes 814 along the length of the plate and in the center of the plate. Holes 812 are for through-bolts 831, which pass through the height of the stack 800, and are secured with nuts 818. Set screws 816 may be threaded into the threaded holes 814 and tightened against the anode endplate 820 to contribute to the sealing of the stack. The compression plate may be any rigid material, for example metal, glass, ceramic or plastic. Examples of compression plate materials include plastics such as polycarbonates, polyesters, and polyetherimides; and metals such as stainless steel and titanium.

The anode endplate 820 includes a back plate 822, holes 823 for the through-bolts 831, a current collector 826, and an anode assembly 828. The back plate 822 may be any rigid material, for example metal, glass, ceramic or plastic. The current collector 826 may include any conducting material, for example metal, graphite, or conducting polymer. The current collector can be connected to an electrical circuit, such as by attaching an electrical binding post to an optional hole 827 at the side edge of the current collector. The back plate and current collector optionally may be separated by an insulating layer (not shown). An insulating layer may be unnecessary if the back plate is not electrically conductive. The anode assembly 828 preferably includes an anode having an anode catalyst, and a microfluidic channel structure.

The cathode endplate 830 includes through-bolts 831, a back plate 832, holes 833 for the through-bolts 831, holes 834 for electrolyte conduits, holes 835 for gas conduits, a current collector 836, and a cathode assembly 838. The back plate 832 may be any rigid material, for example metal, glass, ceramic or plastic. The current collector 836 may include any conducting material, for example metal, graphite, or conducting polymer. The current collector can be connected to an electrical circuit, such as by attaching an electrical binding post to an optional hole 837 at the side edge of the current collector. The back plate and current collector optionally may be separated by an insulating layer (not shown). An insulating layer may be unnecessary if the back plate is not electrically conductive. The through-bolts 831 may include optional insulating sleeves 839. The cathode assembly 838 preferably includes a GDE, a cathode catalyst, and a hydrogel. The hydrogel includes an aqueous liquid and a polymer, as described for hydrogel 222 in the example of FIG. 2.

The electrode assembly 840 includes a bipolar plate 842, holes 843 for the through-bolts 831, holes 844 for electrolyte conduits, holes 845 for gas conduits, an anode face 846, and a cathode face 848. The bipolar plate 842 provides for electrical conduction between the anode face 846 and the cathode face 848. The combination of a single electrode assembly 840 with an anode endplate 820 and a cathode endplate 830 provides for two complete fuel cells connected in series, with one cell between the anode endplate and the cathode face of the electrode assembly, and the other cell between the cathode endplate and the anode face of the electrode assembly. Multiple electrode assemblies may be arranged in series, such that the cathode face 848 of one assembly is in contact with the anode face 846 of the other assembly. The number of fuel cells in stack 800 is one plus the number of electrode assemblies 840 in the stack.

The stack 800 may be assembled by combining the compression plate 810, the anode plate 820, multiple electrode assemblies 840, and the cathode plate 830, such that the anode assembly 828 is in contact with the cathode face 848 of an electrode assembly, the cathode assembly 838 is in contact with the anode face 846 of another electrode assembly, and the electrode assemblies are oriented such that the cathode and anode faces are in contact in pairs. A through-bolt 831 is placed through each bolt hole provided when the components are aligned, and each bolt is secured at the end with a nut 818. The set screws 816 are tightened against the anode plate as necessary to seal the stack.

The stack 800 may be operated by connecting one hole 834 to an electrolyte supply, connecting the other hole 834 to an electrolyte outlet, connecting one hole 835 to a gas supply, connecting the other hole 835 to a gas outlet, and connecting current collectors 826 and 836 to an electrical circuit. When an electrolyte containing a fuel is circulated through the electrolyte inlet and outlet, and a gas containing an oxidant is circulated through the gas inlet and outlet, an electric potential is generated, and current flows through the electrical circuit in proportion to the external load.

Figure 9:
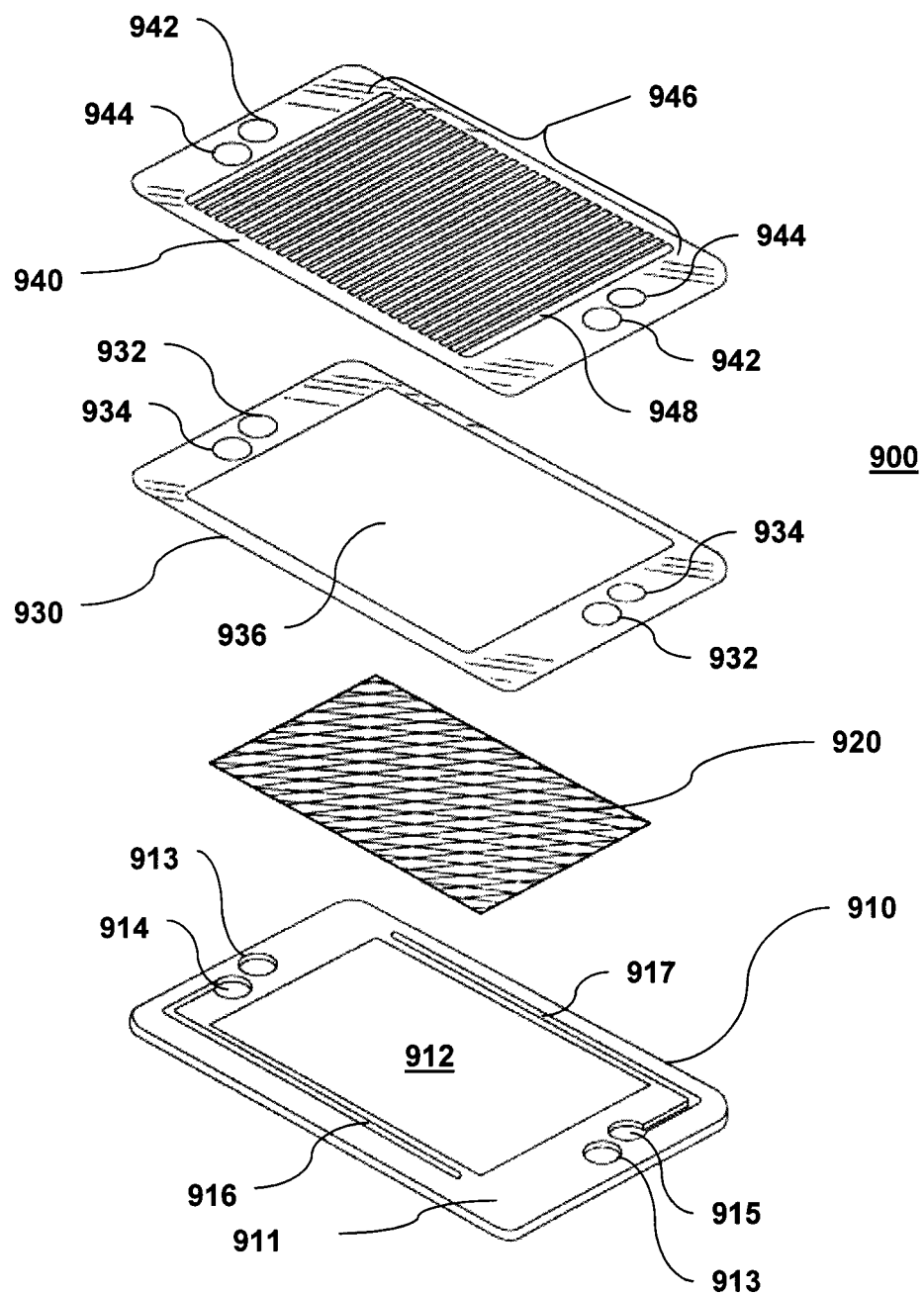
FIG. 9 is a representation of an anode endplate for a fuel cell stack.

FIG. 9 is an exploded perspective representation of an example of an anode assembly 900 that may be used as an anode assembly 828 in fuel cell stack 800. Anode assembly 900 includes an anode plate 910, an anode 920, optional gasket 930, and a microfluidic channel layer 940. The anode plate 910 includes a perimeter 911, a conductive region 912 inside the perimeter, holes 913, indentations 914 and 915, and manifolds 916 and 917. Preferably the anode plate 910 is rigid. The perimeter 911 and the conductive region 912 may be a single piece of conducting material, such as metal, graphite or conducting polymer. Examples of conducting materials include graphite, stainless steel and titanium. The perimeter 911 and the conductive region 912 may be different materials. For example, the perimeter may be an electrically and ionically insulating material. Examples of perimeter materials include polycarbonates, polyesters, polyphenylene oxide (PPO), polyphenylene sulfide (PPS), poly(etheretherketone) (PEEK), polybenzimidazole (PBI), polyimides including polyetherimide, high-density polyethylene, and poly(tetrafluoroethylene). The top surfaces of the perimeter 911 and the conductive region 912 may be co-planar, or they may be in different planes. For example, at least a portion of the conductive region may be inset into the plate, such that it forms a trough in the center of the plate.

The holes 913 align with through-bolt holes that pass through the height of a stack in which the anode assembly is present. The indentations 914 and 915 are an inlet and an outlet, respectively, for a flowing electrolyte. Inlet indentation 914 is in fluid communication with inlet manifold 916. Outlet indentation 915 is in fluid communication with outlet manifold 917. Preferably the inlet, outlet, and manifolds are electrically and ionically isolated from the conductive region 912. In one example, the inlet, outlet, and manifolds are present in a perimeter 911 that is electrically and ionically insulating. In another example, the inlet, outlet, and manifolds are coated with a material that is an electrical and ionic insulator, such as an ULTEM® coating. Preferably each manifold terminates at a point in line with the end of the conductive region 912.

The anode 920 includes an anode catalyst, and optionally includes a carbon layer. In one example, a catalyst ink containing Pt/Ru catalyst and Nafion® binder is applied directly to the conducting region 912. In another example, a catalyst ink is applied to a graphite sheet and subjected to hot-pressing to stiffen the electrode and to normalize the electrode height. From this material, an individual anode can be cut to an appropriate size, such as a size matching the conducting region 912, or a size matching the inner dimensions of a trough of the conducting region 912. The anode may be adhered to the conducting region during assembly of the stack by a small amount of carbon paint.

The optional gasket 930 is a material having a minimum compressed thickness. Optional gasket 930 includes a hole 932 at each end for a through-bolt, a hole 934 at each end for an electrolyte conduit, and a central opening 936. In one example, the gasket includes a non-compressible film that is hot-bonded to the perimeter 911 of the anode plate. This type of gasket may be useful when the anode 920 is formed from the direct application of a catalyst ink. In another example, the gasket includes a non-compressible film having an adhesive on each side. One side of the film is adhered to a compressible film, and the other side of the film is adhered to the perimeter 911 of the anode plate. The gasket of this example may be useful when the anode 920 includes an anode catalyst on a carbon layer, since the thickness of the compressed gasket can match the thickness of the anode that extends above the plane of the anode plate 910.

The microfluidic channel layer 940 is a non-compressible film having a hole 942 at each end for a through-bolt, a hole 944 at each end for an electrolyte conduit, and a channel pattern 946 that includes multiple spaces 948. The channel pattern 946 overlays the manifolds 916 and 917 and the anode 920, and provides part of the microfluidic channel structure. The thickness of the film and the width of the spaces 948 define the dimensions of the microfluidic channels for the flowing electrolyte. The top and bottom of the microfluidic channels are provided on one side by the anode, and on the other side by a cathode assembly or the cathode face of an electrode assembly.

Figure 10:
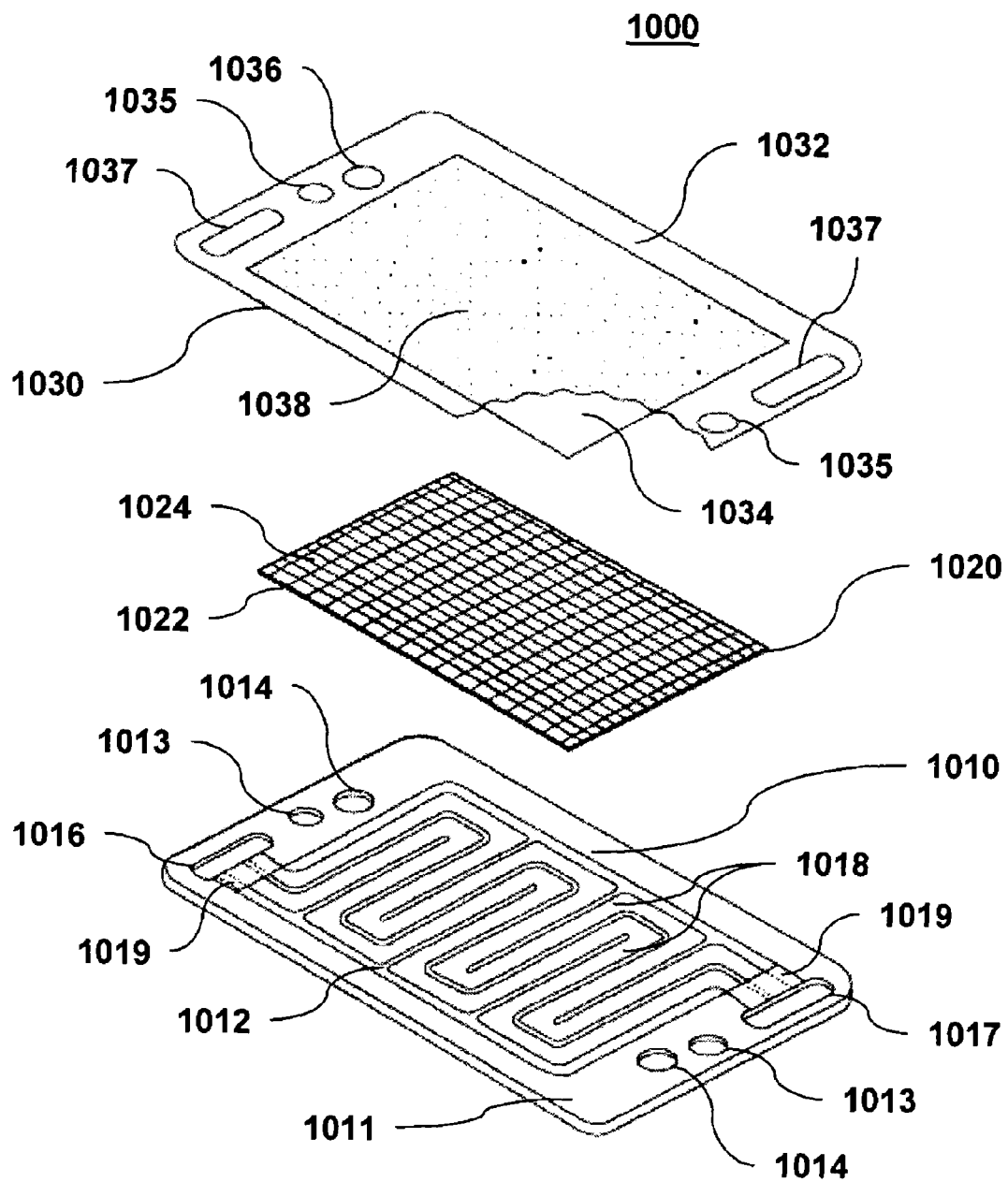
FIG. 10 is a representation of a cathode endplate for a fuel cell stack.

FIG. 10 is an exploded perspective representation of an example of a cathode assembly 1000 that may be used as a cathode assembly 838 in fuel cell stack 800. Cathode assembly 1000 includes a cathode plate 1010, a cathode 1020 that includes a GDE 1022 and a cathode catalyst 1024, and a barrier layer 1030 that includes a screen 1032 and a hydrogel 1034. The cathode plate 1010 includes a perimeter 1011, a conductive region 1012 inside the perimeter, holes 1013, 1014, 1016 and 1017, and gas flow channels 1018. Preferably the cathode plate is rigid. The perimeter 1011 and the conductive region 1012 may be a single piece of conducting material, such as metal, graphite or conducting polymer. The perimeter 1011 and the conductive region 1012 may be different materials. For example, the perimeter may be an electrically and ionically insulating material.

The holes 1013 align with through-bolt holes that pass through the height of the stack in which the cathode assembly is present. The holes 1014 align with electrolyte conduits that pass through the height of the stack, and the holes 1016 and 1017 align with gas conduits that pass through the height of the stack. Preferably the holes 1014 are electrically and ionically isolated from the conductive region 1012. In one example, the holes 1014 are present in a perimeter 1011 that is electrically and ionically insulating. In another example, the holes and/or the entire perimeter 1011 are coated with a material that is an electrical and ionic insulator, such as an ULTEM® coating.

The gas flow channels 1018 may have a variety of configurations. FIG. 10 illustrates serpentine flow channels, in which each of the two flow channels traverses across the conductive region 1012 from inlet hole 1016 to outlet hole 1017. In another configuration, one gas flow channel is connected only to inlet hole 1016, while the other gas flow channel is connected only to outlet hole 1017. In this interdigitated configuration, the gas from the inlet 1016 passes from an inlet channel, through a portion of the GDE 1022, to the outlet channel, and then to outlet 1017. At either end of the flow channels, a bridge 1019 is present over the portion of the gas flow channels 1018 that extends from a hole 1016 or 1017 to the conductive region 1012. The bridge 1019 may be integral with the cathode plate 1010, or it may be a separate piece that fits over the portion of the gas flow channels. The bridge 1019 may be the same material as the cathode plate, or it may be a different material.

The cathode 1020 may include a GDE 1022 that is coated on one side with a catalyst ink, such as an ink containing a cathode catalyst and a binder. The coated GDE may be dried to form a layer of catalyst 1024 on the GDE. An individual cathode 1020 may then be cut from this coated GDE, such as to a size matching that of the conductive region 1012.

The barrier layer 1030 includes a screen layer 1032 that includes a non-compressible film. The screen layer 1032 has a hole 1035 at each end for a through-bolt, a hole 1036 at each end for an electrolyte conduit (only one shown), a hole 1037 at each end for a gas conduit, and a mesh 1038. The mesh allows liquid to pass through the central area of the screen layer. In one example, the screen layer is made of stainless steel. The hydrogel 1034 includes an aqueous liquid and a polymer, as described for hydrogel 222 in the example of FIG. 2. In one example, the polymer component of the hydrogel 1034 is deposited on the cathode 1020. The hydrogel 1034 is then formed when an electrolyte is introduced into the cell, as the polymer is expanded by the electrolyte.

The cathode assembly 1000 may be assembled by bonding the cathode 1020 to the barrier layer 1030, and then placing the barrier layer 1030 on the conductive region 1012 of the cathode plate 1010. The cathode 1020, the hydrogel 1034, and the mesh 1038 overlay the conductive region 1012. The barrier layer may be attached to the cathode plate by an adhesive, such as a double-sided Kapton® tape having openings for the conductive region, through-bolts, and electrolyte and gas conduits. Pressure and/or heat may be applied to seal the cathode assembly.

Figure 11:
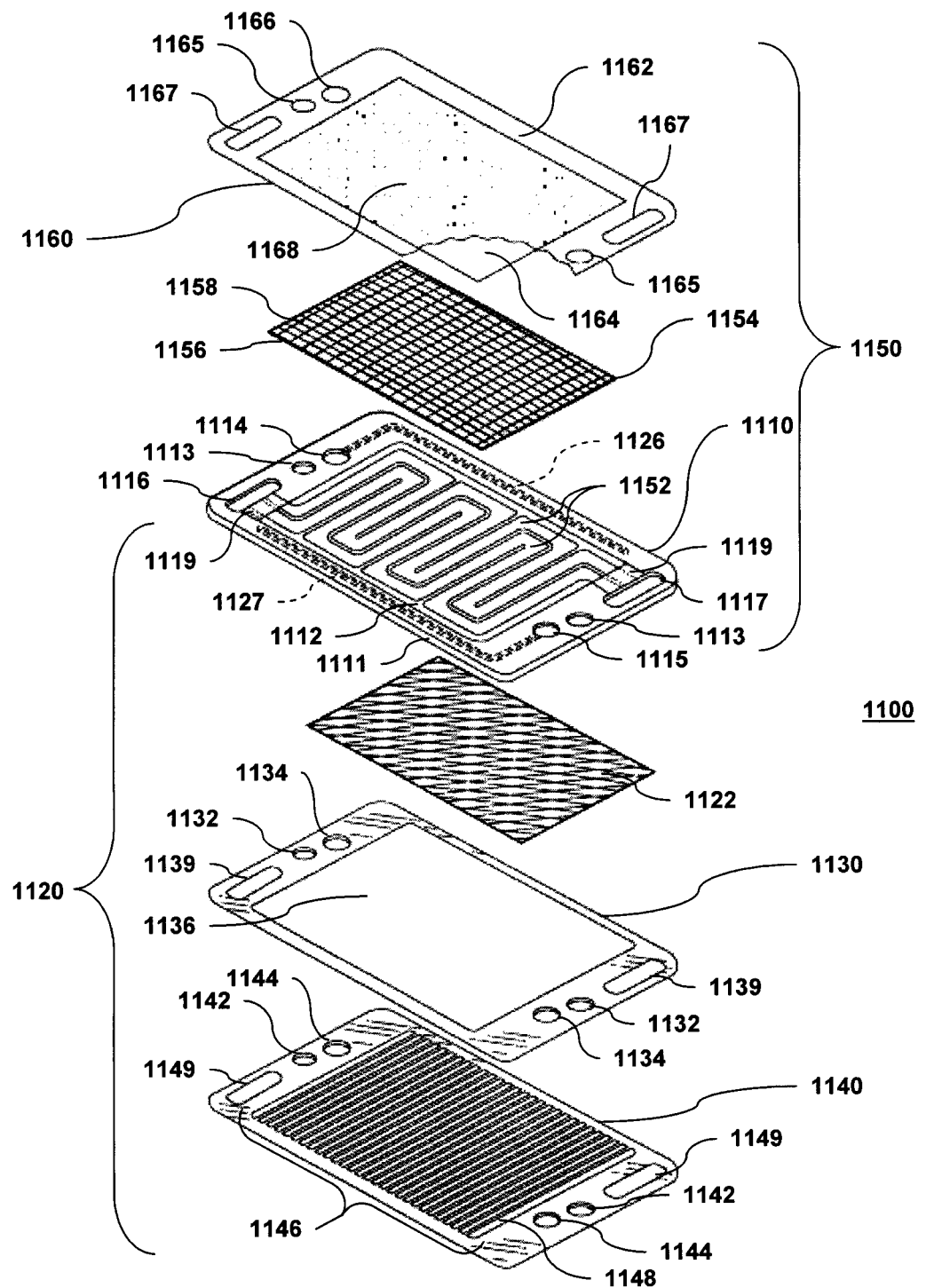
FIG. 11 is a representation of an electrode assembly for a fuel cell stack.

FIG. 11 is an exploded perspective representation of an example of an electrode assembly 1100 that may be used as an electrode assembly 840 in fuel cell stack 800. Electrode assembly 1100 includes a bipolar plate 1110, an anode face 1120 and a cathode face 1150. The bipolar plate 1110 includes a perimeter 1111, a conductive region 1112, and holes 1113, 1114, 1115, 1116 and 1117. Preferably the bipolar plate 1110 is rigid. The perimeter 1111 and the conductive region 1112 may be a single piece of conducting material, such as metal, graphite or conducting polymer. The perimeter 1111 and the conductive region 1112 may be different materials. For example, the perimeter may be an electrically and ionically insulating material. The conducting region 1112 provides for electrical conduction between the anode face 1120 and the cathode face 1150 of the electrode assembly.

The holes 1113 align with through-bolt holes that pass through the height of a stack in which the electrode assembly is present. The holes 1114 and 1115 align with electrolyte conduits that pass through the height of the stack. The holes 1116 and 1117 align with gas conduits that pass through the height of the stack.

The anode face 1120 includes an anode 1122, optional gasket 1130, a microfluidic channel layer 1140, and manifolds 1126 and 1127. On the anode side of the bipolar plate 1110, the surfaces of the perimeter 1111 and the conductive region 1112 may be co-planar, or they may be in different planes. For example, at least a portion of the conductive region may be inset into the plate, such that it forms a trough in the center of the anode side of the plate. Inlet manifold 1126 is in fluid communication with hole 1114. Outlet manifold 1127 is in fluid communication with hole 1115. Preferably the holes 1114 and 1115 and the manifolds 1126 and 1127 are electrically and ionically isolated from the conductive region 1112. In one example, the holes and manifolds are present in a perimeter 1111 that is electrically and ionically insulating. In another example, the holes are coated with a material that is an electrical and ionic insulator, such as an ULTEM® coating.

The anode 1122 includes an anode catalyst, and optionally includes a carbon layer. The anode may be as described above for the anode 920 of the anode assembly 900. An individual anode can be cut to an appropriate size, such as a size matching the conducting region 1112, or a size matching the inner dimensions of a trough of the conducting region 1112. The anode may be adhered to the conducting region during assembly of the stack by a small amount of carbon paint.

The optional gasket 1130 is a compressible material having a minimum compressed thickness. Optional gasket 1130 includes a hole 1132 at each end for a through-bolt, a hole 1134 at each end for an electrolyte conduit, a central opening 1136, and a hole 1139 at each end for a gas conduit. In one example, the gasket includes a non-compressible film having an adhesive on each side. One side of the film is adhered to a compressible film, and the other side of the film is adhered to the anode side of the perimeter 1111 of the bipolar plate. The gasket of this example may be useful when the anode 1122 includes an anode catalyst on a carbon layer, since the thickness of the compressed gasket can match the thickness of the anode that extends above the plane of the bipolar plate 1110.

The microfluidic channel layer 1140 is a non-compressible film having a hole 1142 at each end for a through-bolt, a hole 1144 at each end for an electrolyte conduit, a channel pattern 1146 that includes multiple spaces 1148, and a hole 1149 at each end for a gas conduit. The channel pattern 1146 overlays the manifolds 1126 and 1127 and the anode 1122, and provides part of the microfluidic channel structure. The thickness of the film and the width of the spaces 1148 define the dimensions of the microfluidic channels for the flowing electrolyte. The top and bottom of the microfluidic channels are provided on one side by the anode, and on the other side by the cathode assembly or the cathode face of an electrode assembly.

The cathode face 1150 includes gas flow channels 1152, a cathode 1154 that includes a GDE 1156 and a cathode catalyst 1158, and a barrier layer 1160 that includes a screen 1162 and a hydrogel 1164. The gas flow channels 1152 may have a variety of configurations, such as those described for the gas flow channels 1018 of the cathode assembly 1000. The gas flow channels provide for flow of gas across the conductive region 1112 between the inlet hole 1116 and the outlet hole 1117. At either end of the flow channels, a bridge 1119 is present over the portion of the gas flow channels 1152 that extends from a hole 1116 or 1117 to the conductive region 1112. The bridge 1119 may be integral with the bipolar plate 1110, or it may be a separate piece that fits over the portion of the gas flow channels. The bridge 1119 may be the same material as the bipolar plate, or it may be a different material.

The cathode 1154 may include a GDE 1156 that is coated on one side with a catalyst ink, such as an ink containing a cathode catalyst and a binder. The coated GDE may be dried to form a layer of catalyst 1158 on the GDE. An individual cathode 1154 may then be cut from this coated GDE, such as to a size matching that of the conductive region 1112. The barrier layer 1160 includes a screen layer 1162 that includes a non-compressible film. The screen layer 1162 has a hole 1165 at each end for a through-bolt, a hole 1166 at each end for an electrolyte conduit (only one shown), a hole 1167 at each end for a gas conduit, and a mesh 1168. The hydrogel 1164 includes an aqueous liquid and a polymer, as described for hydrogel 222 in the example of FIG. 2. In one example, the polymer component of the hydrogel 1164 is deposited on the cathode 1154. The hydrogel 1164 is then formed when an electrolyte is introduced into the cell, as the polymer is expanded by the electrolyte. The screen layer 1162 and the assembly of the cathode face with the bipolar plate may be as described for the cathode assembly 1000.

Examples of back plate materials include plastics such as polycarbonates, polyesters, and polyetherimides; and metals such as stainless steel and titanium. Examples of current collector materials include copper plates, gold plates, and printed circuit boards coated with copper and/or gold. Examples of insulating layer materials include polysiloxanes, polyphenylene oxide (PPO), polyphenylene sulfide (PPS), poly(etheretherketone) (PEEK), polybenzimidazole (PBI), polyimides including polyetherimide, high-density polyethylene, and poly(tetrafluoroethylene). Examples of conducting materials for electrode plates and bipolar plates, or for conducting regions within these plates, include graphite, stainless steel and titanium. Examples of perimeter materials include polycarbonates, polyesters, polyphenylene oxide (PPO), polyphenylene sulfide (PPS), poly(etheretherketone) (PEEK), polybenzimidazole (PBI), polyimides including polyetherimide, high-density polyethylene, and poly(tetrafluoroethylene). Examples of non-compressible film materials include polycarbonates, polyesters, polyphenylene oxide (PPO), polyphenylene sulfide (PPS), poly(etheretherketone) (PEEK), polybenzimidazole (PBI), polyimides including polyetherimide, high-density polyethylene, and poly(tetrafluoroethylene). Examples of compressible film materials include ePTFE, polysiloxanes, and expanded polyethylene.

Fuel cells including a liquid electrolyte and a hydrogel, and fuel cell stacks including such fuel cells, may be incorporated into a power supply device. A power supply device includes other components, including components that deliver the fuel and oxidant to the cell or stack. Examples of input components include reservoirs of electrolyte, fuel, and/or oxidant; pumps; blowers; mixing chambers; and valves. Other components that may be present in a power supply device include vents, electrical connectors, a power converter, a power regulator, an auxiliary power supply, a heat exchanger, and temperature control components.

A power supply device may include control components, such as sensors and computer readable program code. Sensors may be used to measure various properties of the cell, stack and/or device, such as temperature, composition of input and/or output streams, reagent supply levels, electrochemical performance of the cell or stack, and electrical performance of the device. Computer readable program code may be stored on a microprocessor, a memory device or on any other computer readable storage medium. The program code may be encoded in a computer readable electronic or optical signal. The code may be object code or any other code describing or controlling the functionality described in this application. The computer readable storage medium may be a magnetic storage disk such as a floppy disk; an optical disk such as a CD-ROM; semiconductor memory; or any other physical object storing program code or associated data. A computer readable medium may include a computer program product including the computer readable program code. Algorithms, devices and systems relating to the code may be implemented together or independently. The sensors may provide input to the code regarding the properties of the cell, stack and/or device.

Figure 12:
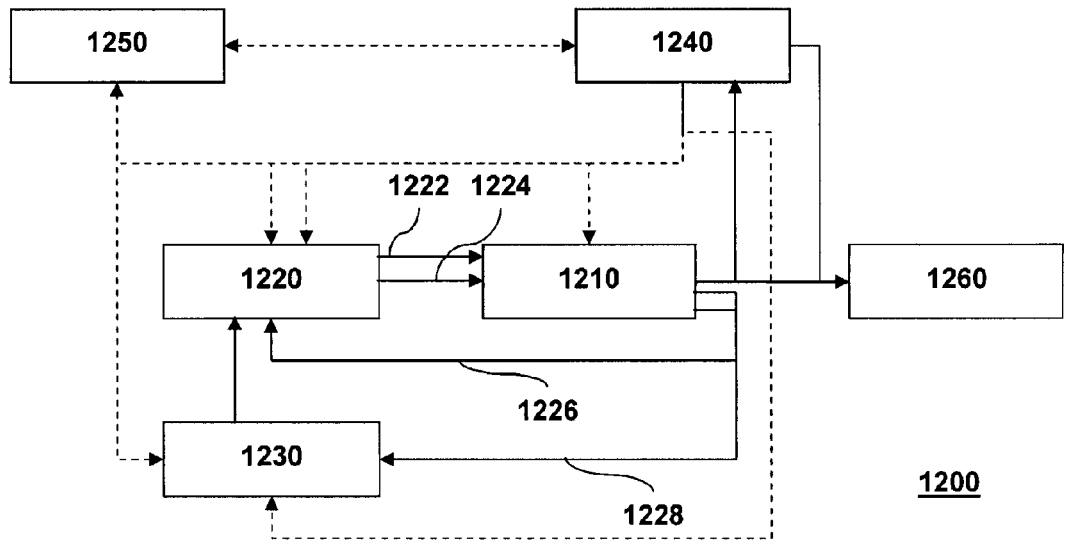
FIG. 12 is a schematic representation of a power supply device.

FIG. 12 is a schematic representation of an example of a power supply device 1200 that may be a portable power supply device. Power supply device 1200 includes a fuel cell stack 1210, a reagent system 1220, an optional heat exchanger 1230, an auxiliary power supply 1240, a control system 1250, and an output connection 1260. The fuel cell stack 1210 includes one or more fuel cells having a liquid electrolyte and a hydrogel.

The reagent system 1220 includes an electrolyte reservoir, a fuel reservoir, an optional oxidant reservoir, a mixing chamber, one or more pumps, an optional blower, a fuel supply line 1222 for delivering fuel to the stack 1210, and an oxidant supply line 1224 for delivering oxidant to the stack. The electrolyte may be mixed with either the fuel or the oxidant. If the oxidant is air, the optional blower may be present to facilitate delivery of the oxidant to the stack. If the oxidant is a gas other than air, the reagent system 1220 may include the optional oxidant reservoir, such as a supply of compressed gas. The reagent system 1220 may include return lines for the effluent electrolyte mixture 1226 and/or for the effluent gas mixture 1228. The effluent electrolyte mixture may be returned to the mixing chamber. The effluent gas mixture may be vented outside of the stack; however, water in the effluent gas may be condensed into the mixing chamber by the optional heat exchanger 1230.

The optional heat exchanger 1230 includes a gas inlet, a gas outlet, and a heat exchange fluid. The gas inlet can accept effluent gas from the stack 1210, and the gas may be vented from the gas outlet to the surrounding environment. The gas may flow in gas flow channels through the heat exchange fluid, and/or the gas may flow around channels containing the heat exchange fluid. The heat exchange fluid preferably is at a lower temperature than the effluent gas from the stack. Heat exchange fluids may include, for example, ethylene glycol and/or propylene glycol. The temperature of the heat exchange fluid may be controlled by circulating atmospheric air around a container for the fluid. Temperature control of the heat exchange fluid also may include circulating the fluid, such as circulating through fluid channels, so that the circulating atmospheric air can more effectively absorb heat from the fluid.

The auxiliary power supply 1240 is used to provide power to the other components of the device 1200. The power from the auxiliary power supply may be used throughout the operation of the device, or it may be used until the fuel cell stack 1210 can provide sufficient power to the other components. The auxiliary power supply preferably includes a rechargeable battery. The rechargeable battery may be charged by the fuel cell stack and/or by an external power source.

The control system 1250 provides for control of the other components of the device 1200. Examples of processes that may be controlled by the control system include turning the auxiliary power supply 1240 on and off, turning the components of the reagent system 1220 on and off, adjusting the input of fuel or oxidant into an electrolyte mixture, and controlling the rate of heat exchange from the effluent gas. Examples of processes that may be controlled by the control system also include the distribution of power from the auxiliary power supply 1240 and/or the stack 1210 to the other components of the device, cycling of the fuel cell stack, safety protocols such as emergency shut-down of the device, and transmitting a signal to a user of the device. The control system may be activated by a switch and/or may be activated when an electrical load is connected to the device.

In one example, the power supply device 1200 can provide electrical power to an electrical load connected to the device when the control system 1250 is activated. In this example, the fuel is present in an electrolyte/fuel mixture. In a first phase, electrical power is supplied to the load, to the reagent system 1220, to the heat exchanger 1230, and to the control system 1250 by the auxiliary power supply 1240. At start-up, the electrolyte/fuel mixture within the fuel cell stack 1210 preferably includes a higher concentration of fuel than that used during ongoing operation of the stack. The reagent system 1220 may start the delivery of the electrolyte/fuel mixture and the oxidant simultaneously, or it may start the delivery of one reagent first, followed by the other reagent after a delay time. The stack 1210 begins to produce electrical power, and also may warm up to a predetermined operating temperature range.

In a second phase, once the power from the stack 1210 has reached a threshold level, the control system 1250 turns off the auxiliary power supply 1240. The load, the reagent system 1220, the heat exchanger 1230 and the control system 1250 are then powered by the stack 1210. The power from the stack 1210 is also used to recharge the auxiliary power supply 1240. The control system can adjust various parameters of the device, based on predetermined operating programs and/or on measurements from sensors in the device. For example, the operation and/or speed of a fan that circulates air past a heat exchange fluid container can be controlled based on the internal cell resistance, such that a lower internal resistance results in a higher rate of heat exchange. In another example, the concentration of fuel in the electrolyte/fuel mixture can be raised or lowered during operation. In another example, the auxiliary power supply 1240 can be turned on for a variety of reasons, such as an increase in power draw by the load, an "off" cycle of the stack 1210, depletion of the fuel or oxidant, or to make up for declining stack performance.

In a third phase, the device 1200 is shut down. Shut down of the device may be initiated manually or may be initiated automatically, such as by the disconnection of the load from the device. The concentration of fuel in the electrolyte/fuel mixture is raised to a level higher than that used during the second phase, and the mixture is briefly circulated through the stack 1210. The control system 1250 may perform other functions, such as closing of valves and vents, resetting of switches, and switching the output connection 1260 such that it is connected to the auxiliary power supply 1240.

Fuel cells including a liquid electrolyte and a hydrogel, and fuel cell stacks and/or power supply devices including such fuel cells, may be useful in portable and mobile fuel cell systems and in electronic devices. Examples of electronic devices that may be powered at least in part by such cells, stacks or power supply devices include cellular phones, laptop computers, DVD players, televisions, personal data assistants (PDAs), calculators, pagers, hand-held video games, remote controls, cassette players, CD players, radios, audio players, audio recorders, video recorders, cameras, navigation systems, and wristwatches. This technology also may be useful in automotive and aviation systems, including systems used in aerospace vehicles.

The following examples are provided to illustrate one or more preferred embodiments of the invention. Numerous variations may be made to the following examples that lie within the scope of the invention.

EXAMPLES

Example 1

Preparation of Poly(Vinyl Alcohol) (PVA) Solutions

Required amounts of two different grades of PVA were each weighed into a separate 250 milliliter (mL) Erlenmeyer flask. Deionized water was added to each flask for a total solution weight of 150 grams (g). A magnetic stir bar was placed into each flask, the flasks were partially sealed to prevent excessive loss of water, and the mixtures were gently but thoroughly stirred at about 70° C. until no discernible solids remained (about three hours). The average molecular weights of the two different grades of PVA were (A) 146,000-186,000 daltons (ALDRICH; stock #363162, lot #07412AD) and (B) 30,000-50,000 daltons (ALDRICH, Milwaukee, Wis.; stock #363138, lot #07425DE). The solution compositions are shown in Table 1.

TABLE 1

PVA Solution Compositions

|   | PVA Weight % | PVA Average MW (daltons) | PVA Mass (g) | Water Mass (g) |
|---|---|---|---|---|
| A | 5 | 146,000-186,000 | 7.5 | 142.5 |
| B | 15 | 31,000-50,000 | 22.5 | 127.5 |

Example 2

Fabrication of Platinum-Based Cathode

A cathode catalyst ink was prepared by placing 50 wt % platinum on carbon black (HiSPEC™ 8000; Alfa Aesar, Ward Hill, Mass.; stock #43989, lot #D18R027) in a sample vial containing a magnetic stir bar. The supported catalyst (0.3791 g) was then contacted with water (1.50 g), and with dimethyl acetamide (DMAC, 0.75 g) to wet the surface. To this mixture was added 3.7595 g of a 5 wt % solution of Nafion® in a mixture of water and alcohols (ALDRICH; stock #527084, lot #10106DE). The resulting ink was then mixed briefly with magnetic stirring, followed by ultra-sonication for 60 minutes, and then magnetic stirring for 60 minutes.

A cathode was formed by coating a gas diffusion medium with this cathode catalyst ink. The gas diffusion medium was a 10% teflonized carbon substrate with a microporous layer on one side and a total thickness of 235 micrometers (Sigracet® 24 BC; SGL Carbon). The ink was applied to the gas diffusion medium with a paint brush and then dried on a hot plate to form the cathode. The solids loading and metal loading for a given cathode were calculated based on weight measurements between subsequent steps.

Example 3

Formation of Hydraulic Barrier Containing a Hydrogel with High Molecular Weight PVA A cathode was prepared according to Example 2, with a solids loading of 0.1684 g and a platinum loading of 1.0 milligrams per square centimeter ($mg/cm^2$). PVA Solution A from Example 1 (5 g) was added to a 20 mL sample vial containing a small magnetic stir bar. Glutaric dialdehyde (0.0907 g, 25 wt. % solution in water; ALDRICH, stock #G4004, lot #13502TD) was added, and the solution was thoroughly mixed. Five drops of a 2 molar (M) sulfuric acid solution in water were then added, and again the solution was thoroughly mixed. Care was taken not to introduce any air bubbles into the solution during the mixing process. Before the solution crosslinked, it was applied to the cathode with a paintbrush, providing one continuous layer over the entire electrode surface. Once the PVA had completely air dried, a second coat was applied and allowed to air dry. The resulting coated cathode was placed between two fiberglass films coated with poly(tetrafluoroethylene) (PTFE) and annealed in a Carver press at 200 lbs and 248° F. (120° C.) for 20 minutes.

The uncrosslinked PVA Solution A from Example 1 also was applied with a paint brush to the edges of a stainless steel foil that had a photoetched central area. The central area had a porosity of 80%. The PVA was allowed to completely air dry. The edges of the coated cathode were then painted with the PVA solution and immediately contacted with the coated edges of the stainless steel foil. The cathode and foil were bonded together in a Carver press at 100 lbs for 1 hour.

Example 4

Formation of Hydraulic Barrier Containing a Hydrogel with Low Molecular Weight PVA A cathode was prepared according to Example 2, with a solids loading of 0.2237 g and a platinum loading of 1.3 $mg/cm^2$. PVA Solution B from Example 1 (5 g) was added to a 20 mL sample vial containing a small magnetic stir bar. Glutaric dialdehyde (0.2556 g, 25 wt. % solution in water; ALDRICH, stock #G4004, lot #13502TD) was added, and the solution was thoroughly mixed. Five drops of a 2 M sulfuric acid solution in water were then added, and again the solution was thoroughly mixed. Care was taken not to introduce any air bubbles into the solution during the mixing process. Before the solution crosslinked, it was applied to the cathode with a paintbrush, providing one continuous layer over the entire electrode surface. Once the PVA had completely air dried, the resulting coated cathode was placed between two PTFE-coated fiberglass films and annealed in a Carver press at 200 lbs and 248° F. (120° C.) for 20 minutes.

The uncrosslinked PVA Solution B from Example 1 also was applied with a paint brush to the edges of a stainless steel foil that had a photoetched central area. The central area had a porosity of 80%. The PVA was allowed to completely air dry. The edges of the coated cathode were then painted with the PVA solution and immediately contacted with the coated edges of the stainless steel foil. The cathode and foil were bonded together in a Carver press at 100 lbs for 1 hour.

Example 5

Formation of Hydraulic Barrier Containing a Hydrogel with Nafion®

A cathode was prepared according to Example 2, with a solids loading of 0.1405 g and a platinum loading of 0.85 mg/cm$^2$. A 5 wt % solution of Nafion® in a mixture of water and alcohols (ALDRICH) was applied to the cathode with a paintbrush. The coated cathode was dried on a hot plate, and then a second coat of the Nafion® solution was applied and dried.

The Nafion® solution also was applied with a paint brush to the entire area of a stainless steel foil that had a photoetched central area with a porosity of 80%. A Nafion® 112 film was placed between the cathode and the foil, and the cathode, foil and film were hot-bonded the foil in a Carver press at 8,000 lbs and 300° F. for 5 minutes.

Example 6

Fuel Cells Containing Cathodes Having Hydraulic Barriers

The cathodes of Examples 3-5 were incorporated into microfluidic fuel cells and tested under fuel cell operating conditions. The test fuel cell included two back plates, two current collectors, an anode plate, a microfluidic channel layer, a cathode plate, and through-bolts. The cell had a length of 110 mm, a width of 92 mm, and a thickness of 30.2 mm.

The back plates were ULTEM® polyetherimide plates each having a thickness of 12.6 mm. Each plate had eight holes for through-bolts at the perimeter of the plate, with one hole at each corner, and one hole at the middle of each side of the plate. Each back plate also had one threaded hole for an electrolyte port on a width edge, and one threaded hole for a gas port on a length edge. The outside surface of each plate was flat, while the inside surface of each plate had a number of grooves. Each of the gas and electrolyte ports was surrounded with an oval groove on the inside surface, in which a VITON® o-ring was placed. The inside surface also had a rectangular inset in the center of the plate, with a length of 83 mm, a width of 62.086 mm, and a depth of 1.5 mm. At the center of the length edge of each side of the rectangle, the inset had rectangular extensions connecting the central rectangle to the length edge of the plate. These extensions each had a length of 25.778 mm, and a width of 14.957 mm.

The current collectors were FR-4 printed circuit board plates having a copper coating on one side, and having a gold coating on the copper. In the cell, the electrically insulating face of each plate was in contact with the back plate. Each plate was shaped to match the dimensions of the inset in the back plate, with an additional triangular extension connected to each rectangular extension. In each rectangular extension area, a hole was present that aligned with the through-bolt hole at the center of the length edge of the back plate. Each triangular extension had a height of 11.5 mm, and included a hole to which was fitted an electrical binding post connector.

The anode plate included a graphite plate (SGL Carbon) having a thickness of 2.5 mm, and having through-bolt holes and port holes that aligned with those of the back plates and current collector plates. The side of the graphite plate in contact with the current collector was flat. The other side of the graphite plate included a manifold extending along a portion of the length edge of the plate, an L-shaped inset over each manifold where the manifold connected to the electrolyte port hole, and a groove around the perimeter of the port holes and a portion of the manifold. Each electrolyte port hole was a rounded rectangle 9 mm long and 3 mm wide, oriented parallel to the width edge of the plate. Each manifold included a channel parallel with the length edge of the plate, where the channel was 87.334 mm long, 2 mm wide and 1 mm deep. The L-shaped inset had a length of 9 mm in contact with the length edge of the port hole, and had a first portion away from the length edge of the plate and a second portion near the length edge of the plate. The first portion had a length of 6.172 mm and a width of 2 mm. The second portion was perpendicular to the port hole and had a length of 4.893 mm and a width of 3.657 mm. The depth of the inset was 0.25 mm. A 0.25 mm thick stainless steel bridge piece was electrically insulated and placed into each inset. The perimeter groove had a thickness of 1.397 mm, and traversed a path around the port holes and the portion of the manifold that was parallel with the width edge of the plate, with a space between the groove and the port holes of 1.27 mm. The groove included circular loops around the gas port holes. A silicone dispense gasket was placed into the groove.

The fuel cell anode was formed on the anode plate by first making a catalyst ink containing Pt/Ru and Nafion® (catalyst to binder 9:1). This ink was painted directly onto the patterned side of the anode plate in a rectangular area between the manifolds. The anode catalyst area had an area of 40.1 cm$^2$. The anode catalyst was then hot pressed onto the anode plate at 300° F. and 10,000 pounds in a Carver press.

The microfluidic channel layer was a film of Kapton FN929 that had been patterned by laser machining. The film had a length of 110 mm, a width of 92 mm, and a thickness of 75 micrometers. The film included holes aligning with the through-bolt holes and the port holes. The center of the film had 28 parallel rectangular spaces along the width of the layer, each having a length of 64 mm, a width of 2.25 mm, and spaced from each other by 0.5 mm. When the microfluidic channel layer was placed on the anode end plate, the pattern of the microfluidic channel layer overlaid the anode and the manifolds. The electrolyte inlet and outlet ports were then in fluid connection by way of the microfluidic channels between the two manifolds.

The cathode end plate included a graphite plate (SGL Carbon) having a thickness of 2.5 mm, and having through-bolt holes and port holes that aligned with those of the back plate and the current collector plate. The side of the graphite plate in contact with the current collector was flat. The other side of the graphite plate included gas flow channels between the gas port holes, and a groove around the perimeter of the port holes and gas flow channels. Each gas port hole was a rounded rectangle 18 mm long and 2 mm wide, oriented parallel to the length edge of the plate. The perimeter groove had a thickness of 1.397 mm, and traversed a path around the port holes and the gas flow channels, with a space between the groove and the port holes of 1.27 mm. The groove included circular loops around the electrolyte port holes.

The overall flow channel area had a length of 85 mm and a width of 67 mm. The flow channels were arranged in a pseudo-serpentine configuration in which the fluid path made 3 passes across the flow area. At the end of each pass, the flow channels connected to the flow channels of the next pass through two manifold channels. Likewise, the gas ports were connected to the flow channels through two manifold channels. The first pass included 11 flow channels, the second pass included 9 flow channels, and the third pass included 8 flow channels. Each flow channel had a width of 2 mm and a depth of 1 mm, and the flow channels were spaced from each other by 1 mm.

For an individual fuel cell, one of the cathodes of Examples 3-5 was placed on the cathode plate. Prior to placement, a silicone dispense gasket matching the groove on the cathode plate was placed around the cathode on the stainless steel film. The cathode was placed with the GDE in contact with the plate. The fuel cell was assembled by sandwiching the microfluidic channel layer between the catalyst side of the anode and the stainless steel film of the cathode. This resulting fuel cell was a single test cell having an active area of 40.1 $cm^2$. The test cell was assembled and held in compression in a Carver press at 3,000 pounds and 25° C. to seal the system and ensure electrical contact.

The same anode was used for all the fuel cell testing, and the cathodes from Examples 3-5 were interchanged. Thus, the fuel cells that included the cathode of either Example 3 or Example 4 included a hydrogel containing the neutral hydrophilic polymer PVA. The hydrogel in these fuel cells included a polymer having an acid capacity of approximately 0 meq/g, and having no sulfonic acid groups covalently bound to the polymer. The fuel cell that included the cathode of Example 5 included a hydrogel containing Nafion®, which had an acid capacity of at least 0.9 meq/g and had sulfonic acid groups covalently bound to the polymer.

Example 7

Measurement of Water at Fuel Cell Cathodes

The fuel cells of Example 6 were connected to a Scribner 890CL test station and were fed a stream of electrolyte and a stream of oxygen. The electrolyte stream was 1 M sulfuric acid containing 1 M methanol, and had a flow rate of 10 milliliters per minute (mL/min). The oxygen stream had a flow rate of 500 mL/min. A load was placed on the cell at a constant current of 5 amps. The fuel cells were operated at room temperature. The liquid water in the cathode effluent gas was collected and measured. The measured water was not corrected for water evaporation, which was assumed to be minimal and to be constant for all experiments. The $CO_2$ content in the cathode effluent gas was recorded on a Horriba VA-3000 gas analyzer. Methanol crossover and the theoretical amount of liquid water produced by the crossover were then calculated from the $CO_2$ content of the cathode outflow gas according to the method described in R. Jiang, D. Chu, *Electrochemical and Solid-State Letters*, 5 (7) A156-A159 (2002). The cell voltage was measured over time.

Figure 13:
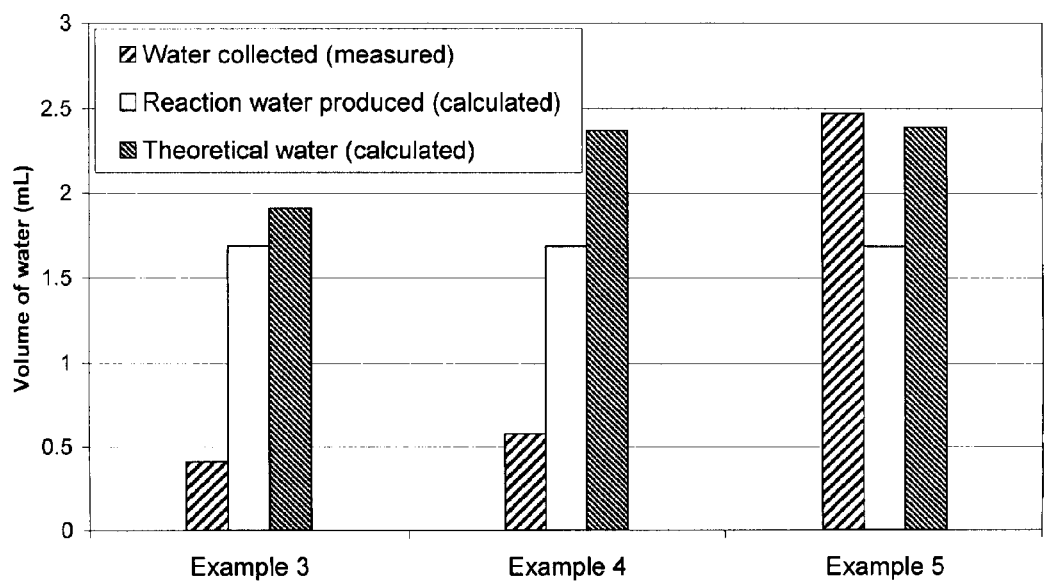
FIG. 13 is a graph of water collected from fuel cells.

FIG. 13 is a bar graph of the water collected from each cell, the calculated amount of water produced by reduction of oxygen at the cathode, and the theoretical amount of water due to oxygen reduction and methanol crossover. All values are for the cell after one hour of operation at constant current. Evaporative loss of liquid water during these experiments was not corrected but was assumed to be negligible. The amounts of water produced by reduction of oxygen at the cathode were the same for each cell, since the cells were operated at the same current. The theoretical amounts of water at the cathode were calculated by adding the water produced by reduction of oxygen at the cathode with the water calculated from the methanol crossover (based on $CO_2$ measurements).

The amounts of water collected from the cells that included the cathode of Example 3 or Example 4 were drastically lower than the amount collected from the cell that included the cathode of Example 5. Even when water related to methanol crossover was taken into account, the amounts of water at the cathodes of the cells including the cathode of Example 3 or Example 4 were much less than the amount water at the cathode of the cell including the cathode of Example 5.

One possible explanation for this reduction in the amount of water collected is that the lack of a strong acid group on the PVA reduces the amount of electro-osmotic drag in the cell. Since osmotic drag is one of the main mechanisms for water transport toward the cathode, minimizing osmotic drag causes the water transport to be governed primarily by diffusion. These forces may be affected by the osmotic pressure difference between the flowing electrolyte and the water generated within the cathode, which will tend to pull water away from the cathode and into the flowing electrolyte.

Figure 14:
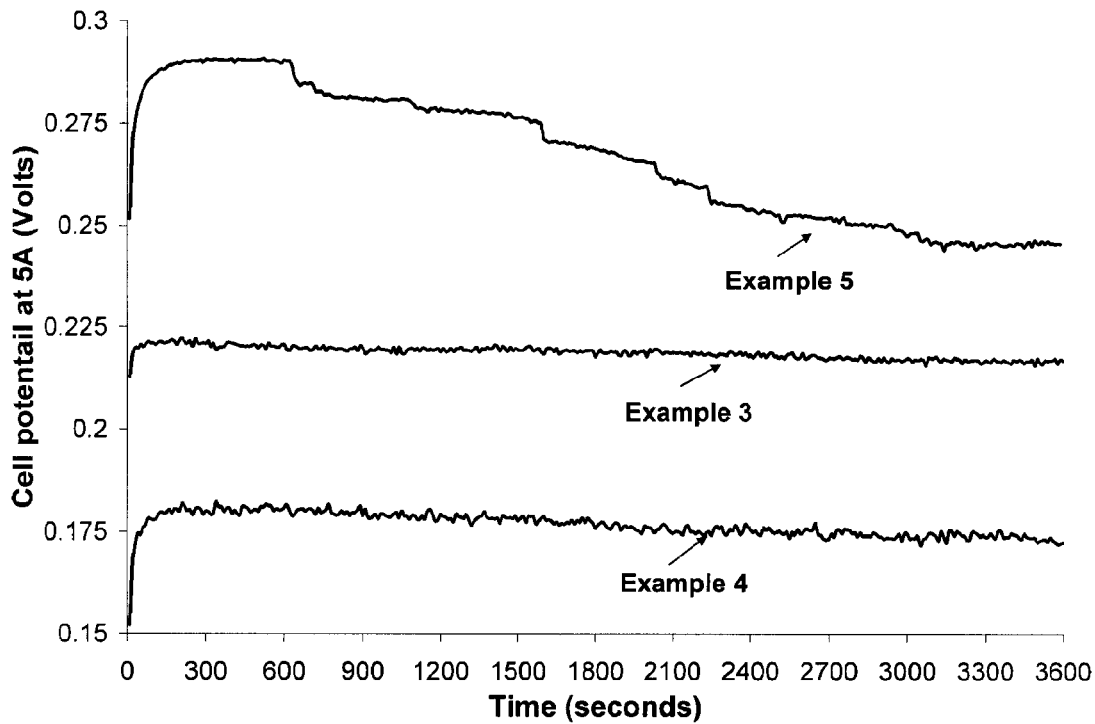
FIG. 14 is a graph of cell potential over time for fuel cells.

FIG. 14 is a graph of cell potential over time for each of the fuel cells. During the 1 hour of operation, the cells that included the cathode of Examples 3 or Example 4 had a much more stable performance than the cell that included the cathode of Example 5. One possible explanation for the increased stability of the cells that included the cathode of Example 3 or Example 4 is that lower amounts of water at the cathode provide for a more uniform and consistent reduction of the oxygen at the cathode. The hydrogel barriers of these cells may reduce the amount of electro-osmotic drag to the cathode, and the resulting microscale flooding within the catalyst. The flowing electrolyte also may increase the rate of removal of water from the cathode by osmosis.

Example 8

Measurement of Cross-Over Current

The fuel cells of Example 6 were connected to a Scribner 890CL test station and were fed a stream of electrolyte and a stream of oxygen. The electrolyte stream was 1 M sulfuric acid containing 1 M methanol, and had a flow rate of 10 mL/min. The oxygen stream had a flow rate of 500 mL/min. A load was placed on the cell at a current of 0 amps for 10 minutes, and then at 5 amps for ten minutes. The fuel cells were operated at room temperature. The $CO_2$ content in the cathode effluent gas was recorded on a Horriba VA-3000 gas analyzer, and methanol crossover was then calculated from the $CO_2$ content of the cathode outflow gas as in Example 7.

Figure 15:
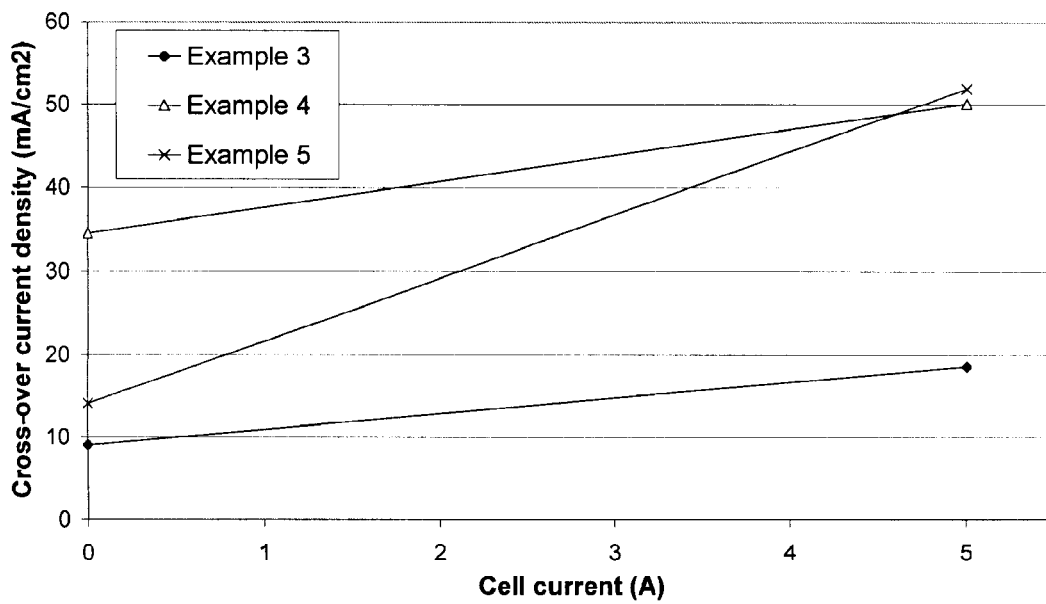
FIG. 15 is a graph of methanol cross-over current density at a constant fuel concentration for fuel cells.

FIG. 15 is a graph of methanol cross-over current density at a constant fuel concentration for the fuel cells. The data was not corrected for $CO_2$ crossover, which is $CO_2$ generated at the anode, crossed over to the cathode and measured in the cathode effluent gas. If this cross-over $CO_2$ were removed, the slopes would likely be less steep; however, the trends in the slopes would remain. See, for example, R. Jiang, D. Chu, *Electrochemical and Solid-State Letters*, 5 (7) A156-A159 (2002). The slope of methanol cross-over was much less for the cells that included the cathode of Examples 3 or Example 4 than for the cell that included the cathode of Example 5. One possible explanation for this reduction in the slope is that the lower electro-osmotic drag for these cells resulted in less transport of solvent, including water and methanol, to the cathode. The contribution of electro-osmotic drag to methanol crossover typically was only observed when the cell was producing a current.

Example 9

Measurement of Fuel Cell Performance

The fuel cells of Example 6 were connected to a Scribner 890CL test station and were fed a stream of electrolyte and a stream of oxygen. The electrolyte stream was 1 M sulfuric acid containing 1 M methanol, and had a flow rate of 10 mL/min. The oxygen stream had a flow rate of 500 mL/min. A variable load was placed on the cell, and the cell voltage was measured, as was the internal cell resistance. The fuel cells were operated at room temperature.

Figure 16:
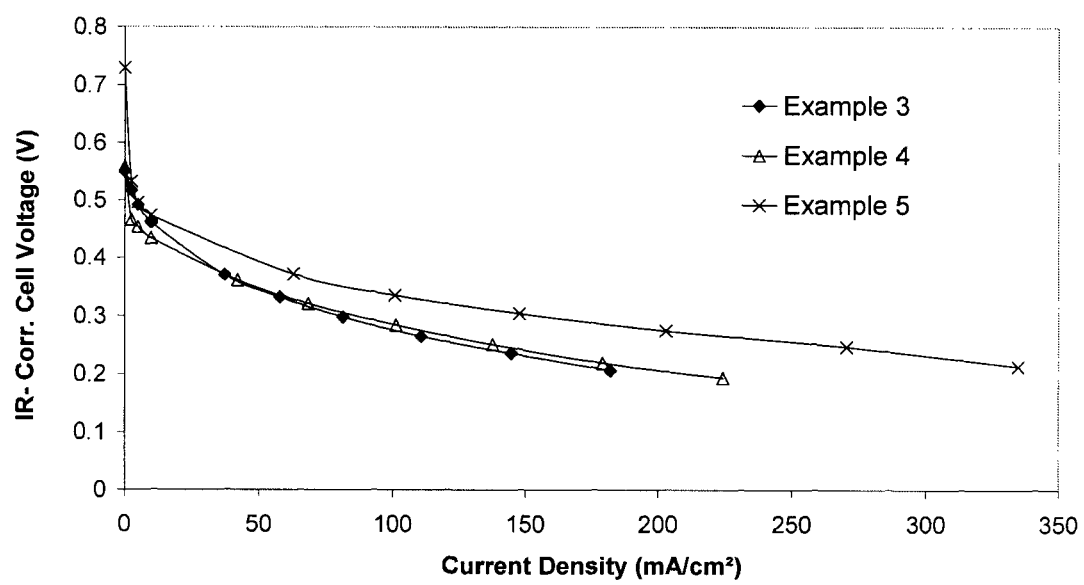
FIG. 16 is a graph of cell voltage as a function of current density, where the data has been normalized for differences in internal resistance, for fuel cells.

FIG. 16 is a graph of cell voltage as a function of current density for the fuel cells, where the data has been normalized for differences in internal resistance. The best performance was observed for the cell that included the cathode of Example 5; however, the cells that included the cathodes of Example 3 or Example 4 showed comparable performance. One possible explanation for the difference in cell performance is that the contact between the cathode catalyst and the PVA hydrogel barriers was not as good as the contact between the cathode catalyst and the Nafion® barrier. Improvements in the coating and/or bonding process may provide improvements in the performance of cells that include a PVA hydrogel barrier.

While various embodiments of the invention have been described, it will be apparent to those of ordinary skill in the art that other embodiments and implementations are possible within the scope of the invention. Accordingly, the invention is not to be restricted except in light of the attached claims and their equivalents.

What is claimed is:

1. A method of generating electricity from a fuel cell, the fuel cell comprising:
   an anode comprising an anode catalyst;
   a cathode, comprising:
     a gas diffusion electrode;
     a cathode catalyst on the gas diffusion electrode, and
     a hydrogel on the cathode catalyst,
   a channel that is contiguous with the anode; and
   a liquid electrolyte in the channel;
   where the hydrogel is between the anode and the cathode, and
   the hydrogel comprises:
     an aqueous liquid and
     a polymer having an acid capacity less than 0.8 meq/g,
   the aqueous liquid has an osmotic pressure of at least 1.2 MPa;
   the method comprising:
   flowing the liquid electrolyte through the channel,
   oxidizing a fuel at the anode, and reducing a gaseous oxidant at the cathode,
   where water generated at the cathode is transported by osmosis into the liquid electrolyte.

2. The method of claim 1, where the polymer comprises a neutral hydrophilic polymer.

3. The method of claim 2, where the polymer comprises poly(vinyl alcohol).

4. The method of claim 1, where the channel is contiguous with the anode and the cathode.

5. The method of claim 4, where the cathode further comprises a screen between the hydrogel and the channel.

6. The method of claim 4, where the anode comprises first and second surfaces,
   the channel is in contact with the first surface of the anode, and
   the fuel cell further comprises an inlet for a fuel, in contact with the second surface of the anode.

7. The method of claim 1, where the liquid electrolyte has an osmotic pressure of at least 1.2 MPa.

8. The method of claim 1, where the aqueous liquid comprises a protic acid.

9. The method of claim 1, where the liquid electrolyte comprises the fuel.

10. The method of claim 1, where the anode comprises first and second surfaces,
    the channel is in contact with the first surface of the anode, and
    the fuel cell further comprises an inlet for the fuel, in contact with the second surface of the anode;
    the method further comprising flowing the fuel through the inlet.

11. The method of claim 1, where the anode comprises first and second surfaces,
    the hydrogel is in contact with the first surface of the anode,
    the channel is in contact with the second surface of the anode, and
    the liquid electrolyte comprises the fuel.

12. A method of generating electricity from a fuel cell, the fuel cell comprising:
    an anode comprising an anode catalyst;
    a cathode, comprising:
      a gas diffusion electrode;
      a cathode catalyst on the gas diffusion electrode, and
      a hydrogel on the cathode catalyst,
    a channel that is contiguous with the anode; and
    a liquid electrolyte in the channel;
    where the hydrogel is between the anode and the cathode, and
    the hydrogel comprises:
      an aqueous liquid and
      a polymer having an acid capacity less than 0.8 meq/g,
    the liquid electrolyte has an osmotic pressure of at least 1.2 MPa;
    the method comprising:
    flowing the liquid electrolyte through the channel,
    oxidizing a fuel at the anode, and
    reducing a gaseous oxidant at the cathode,
    where water generated at the cathode is transported by osmosis into the liquid electrolyte.

13. The method of claim 12, where the polymer comprises a neutral hydrophilic polymer.

14. The method of claim 12, where the polymer comprises poly(vinyl alcohol).

15. The method of claim 12, where the channel is contiguous with the anode and the cathode.

16. The method of claim 15, where the anode comprises first and second surfaces,
    the channel is in contact with the first surface of the anode, and
    the fuel cell further comprises an inlet for a fuel, in contact with the second surface of the anode.

17. The method of claim 12, where the liquid electrolyte comprises the fuel.

18. The method of claim 12, where the anode comprises first and second surfaces,
    the channel is in contact with the first surface of the anode, and
    the fuel cell further comprises an inlet for the fuel, in contact with the second surface of the anode;
    the method further comprising flowing the fuel through the inlet.

19. The method of claim 12, where the anode comprises first and second surfaces,
    the hydrogel is in contact with the first surface of the anode,
    the channel is in contact with the second surface of the anode, and
    the liquid electrolyte comprises the fuel.

* * * * *

UNITED STATES PATENT AND TRADEMARK OFFICE
CERTIFICATE OF CORRECTION

PATENT NO.       : 8,551,667 B2
APPLICATION NO.  : 12/105071
DATED            : October 8, 2013
INVENTOR(S)      : Larry J. Markoski et al.

It is certified that error appears in the above-identified patent and that said Letters Patent is hereby corrected as shown below:

Title Page

Page 3, Item (56) References Cited

Col. 1, line 53, please delete "Naifion" and insert --Nafion--
Col. 1, line 56, please delete "Naifion" and insert --Nafion--

Col. 2, line 20, please delete "Halliday. et al." and insert --Halliday et al.--

Page 4, Item (56) References Cited

Col. 2, line 69, please delete "Findamentals" and insert --Fundamentals--

Page 5, Item (56) References Cited

Col. 1, line 16, please delete "323I" and insert --3231--
Col. 1, line 29, please delete ""perfluorocarbon and fuel cell"" and insert --"perfluorocarbon" and "fuel cell"--
Col. 1, line 31, please delete ""fuel cell and oxygen carrier and perfluror"" and insert --"fuel cell and oxygen carrier" and "perfluor"--
Col. 1, line 35, please delete "perflurocarbons" and insert --"perfluorocarbons"--
Col. 1, line 41, please delete "☐Solubility" and insert --"Solubility--
Col. 1, line 43, please delete "Applications," and insert --Applications",--

Col. 2, line 68, please delete "A."

Page 6, Item (56) References Cited

Col. 1, line 12, please delete "Lagmuir" and insert --Langmuir--

Signed and Sealed this
Eleventh Day of August, 2015

Michelle K. Lee
*Director of the United States Patent and Trademark Office*

CERTIFICATE OF CORRECTION (continued)
U.S. Pat. No. 8,551,667 B2

Col. 1, line 14, please delete "Electrochemical Cells, Fundamentals of Analytical" and insert --"Electrochemical Cells", Fundamentals of Analytical--

Col. 1, line 15, please delete "Chemistry"" and insert --Chemistry,--